(12) United States Patent
Kaplan et al.

(10) Patent No.: US 9,300,505 B2
(45) Date of Patent: *Mar. 29, 2016

(54) SYSTEM AND METHOD OF TRANSMITTING DATA OVER A COMPUTER NETWORK INCLUDING FOR PRESENTATIONS OVER MULTIPLE CHANNELS IN PARALLEL

(71) Applicants: Matthew N. Kaplan, New York, NY (US); Charles C. Wu, Mountain View, CA (US)

(72) Inventors: Matthew N. Kaplan, New York, NY (US); Charles C. Wu, Mountain View, CA (US)

(73) Assignee: HIPPOCRENE LLC, New York, NY (US)

( * ) Notice: Subject to any disclaimer, the term of this patent is extended or adjusted under 35 U.S.C. 154(b) by 393 days.

This patent is subject to a terminal disclaimer.

(21) Appl. No.: 13/903,034

(22) Filed: May 28, 2013

(65) Prior Publication Data

US 2014/0012893 A1 Jan. 9, 2014

Related U.S. Application Data

(63) Continuation of application No. 12/837,451, filed on Jul. 15, 2010, now Pat. No. 8,463,848.

(60) Provisional application No. 61/225,885, filed on Jul. 15, 2009.

(51) Int. Cl.
| | |
|---|---|
| *G06F 15/16* | (2006.01) |
| *H04L 25/14* | (2006.01) |
| *H04L 29/06* | (2006.01) |
| *H04L 29/08* | (2006.01) |

(52) U.S. Cl.
CPC .............. *H04L 25/14* (2013.01); *H04L 65/602* (2013.01); *H04L 65/604* (2013.01); *H04L 67/02* (2013.01); *H04L 65/608* (2013.01)

(58) Field of Classification Search
USPC .......................................... 709/203
See application file for complete search history.

(56) References Cited

U.S. PATENT DOCUMENTS

| | | | | |
|---|---|---|---|---|
| 6,463,460 | B1* | 10/2002 | Simonoff | G06F 3/033 709/203 |
| 2003/0177172 | A1* | 9/2003 | Duursma | G06F 3/1454 709/203 |
| 2005/0065817 | A1* | 3/2005 | Mihai | A61B 5/0002 705/2 |
| 2006/0025136 | A1* | 2/2006 | Fujita | H04W 74/0816 455/436 |
| 2007/0190978 | A1* | 8/2007 | White | H04L 12/583 455/412.1 |
| 2008/0065715 | A1* | 3/2008 | Hsu | H04M 3/4938 709/203 |
| 2009/0198772 | A1* | 8/2009 | Kim | H04L 67/02 709/203 |

* cited by examiner

Primary Examiner — Jason Recek
(74) Attorney, Agent, or Firm — Anna Vishev, Esq.

(57) ABSTRACT

A method and system of transmitting data via a computer network to a plurality of end-users. Transmission of successive data units may be prompted by human-operated and/or automated central control. Successive arrays of data units may be transmitted over a plurality of channels, in parallel. Each end-user chooses which channel or channels to receive and may change channels at will. Transmission of successive arrays may coincide with successive occurrences during the course of a live event. Data units also may be transmitted over one or more channels asynchronously with transmissions over other channels. Controller-prompted transmissions, received passively by end-users, also may be integrated with a facility for end-users to browse data sources in a self-directed sequence and pace.

24 Claims, 17 Drawing Sheets

Key: "CCF" = Controlled-Channel File

| Table 1 - Roster | | |
|---|---|---|
| Player Id # | Last Name | First Name |
| p | Koenig | Mark |
| p+1 | Ruth | Babe |
| p+2 | Gehrig | Lou |
| p+3 | Meusel | Bob |
| p+4 | Lazzeri | Tony |

1010b

| Table 2 - Statistics | | |
|---|---|---|
| Player Id # | Batting Avg. | Home Runs |
| p | .292 | 2 |
| p+1 | .345 | 23 |
| p+2 | .300 | 17 |
| p+3 | .261 | 5 |
| p+4 | .354 | 9 |

1010c

| Table 3 - Cheers | |
|---|---|
| Cheer Id # | Cheer Content |
| c | Let's go team! |
| c+1 | Clap your hands! |
| c+2 | Going... GOING... GONE!!! |
| c+3 | Ohhhhh, almost! Next time! |
| c+4 | Let's do it again!! |

1010d

| Table 4 - Advertisements | |
|---|---|
| Ad Id # | Ad Content |
| a | Beverage X refreshes! |
| a+1 | Detergent Y really cleans! |
| a+2 | Hot dog Z tastes great! |

1012

| Transmission Sequence | | |
|---|---|---|
| Controller's DB Calls | Time | Data Transmitted |
| table 1; id # p | 1:45:00 pm | Now batting: Mark Koenig |
| table 3; id # c+1 | 1:46:00 pm | Clap your hands! |
| tables 1, 2; id # p | 1:46:30 pm | Mark Koenig is batting .292 with 2 home runs. |
| table 4; id # a+2 | 1:47:00 pm | Hot dog Z tastes great! |
| table 3; id # c+3 | 1:48:00 pm | Ohhhhh, almost! Next time! |
| table 1; id # p+1 | 1:49:00 pm | Now batting: Babe Ruth |
| table 4; id # a | 1:50:00 pm | Beverage X refreshes! |
| tables 1, 2; id # p+1 | 1:50:30 pm | Babe Ruth is batting .345 with 23 home runs. |
| table 3; id # c+2 | 1:51:00 pm | Going... GOING... GONE!!! |
| table 1; id # p+2 | 1:54:00 pm | Now batting: Lou Gehrig |
| table 3; id # c+4 | 1:54:30 pm | Let's do it again!! |
| tables 1, 2; id # p+2 | 1:55:00 pm | Lou Gehrig is batting .300 with 17 home runs. |
| table 4; id # a+1 | 1:55:30 pm | Detergent Y really cleans! |
| table 3; id # c | 1:56:00 pm | Let's go team! |

Table 1 - Slides for Romeo and Juliet

| Slide # | English | Spanish | languages 3 ... N |
|---|---|---|---|
| s | JULIET: O Romeo, Romeo, wherefore art thou Romeo? Deny thy father and refuse thy name. Or if thou wilt not, be but sworn my love And I'll no longer be a Capulet. | JULIETA: ¡Ah, Romeo, Romeo! ¿Por qué eres Romeo? Niega a tu padre y rechaza tu nombre; o, si no, júrame tu amor y ya nunca seré una Capuleto. | 3 ... N |
| s+1 | ROMEO: [aside] Shall I hear more, or shall I speak at this? | ROMEO: [al lado] ¿Qué hago, seguirla oyendo o hablar? | 3 ... N |
| s+2 | JULIET: 'Tis but thy name that is my enemy; Thou art thyself, though not a Montague. What's Montague? It is nor hand nor foot, Nor arm nor face, nor any other part Belonging to a man. | JULIETA: Mi único enemigo es tu nombre. Tú eres tú, aunque seas un Montesco. ¿Qué es «Montesco»? Ni mano, ni pie, ni brazo, ni cara, ni parte del cuerpo. | 3 ... N |
| s+3 | O be some other name! What's in a name? That which we call a rose By any other word would smell as sweet. | ¡Ah, ponte otro nombre! ¿Qué tiene un nombre? Lo que llamamos rosa sería tan fragante con cualquier otro nombre. | 3 ... N |
| s+4 | So Romeo would, were he not Romeo call'd, Retain that dear perfection which he owes Without that title. Romeo, doff thy name, and for thy name, which is no part of thee, Take all myself. | Si Romeo no se llamase Romeo, conservaría su propia perfección sin ese nombre. Romeo, quítate el nombre y, a cambio de él, que es parte de ti, ¡tómame entera! | 3 ... N |

| Transmission Sequence ||||
|---|---|---|---|
| Controller's Database Calls | Data Transmitted ||| 
| | Channel 1 | Channel 2 | channels 3 ... N |
| s | JULIET: O Romeo, Romeo, wherefore art thou Romeo? Deny thy father and refuse thy name. Or if thou wilt not, be but sworn my love And I'll no longer be a Capulet. | JULIETA: ¡Ah, Romeo, Romeo! ¿Por qué eres Romeo? Niega a tu padre y rechaza tu nombre; o, si no, júrame tu amor y ya nunca seré una Capuleto. | 3 ... N |
| Next | ROMEO: [aside] Shall I hear more, or shall I speak at this? | ROMEO: [al lado] ¿Qué hago, seguirla oyendo o hablar? | 3 ... N |
| Next | JULIET: 'Tis but thy name that is my enemy; Thou art thyself, though not a Montague. What's Montague? It is nor hand nor foot, Nor arm nor face, nor any other part Belonging to a man. | JULIETA: Mi único enemigo es tu nombre. Tú eres tú, aunque seas un Montesco. ¿Qué es «Montesco»? Ni mano, ni pie, ni brazo, ni cara, ni parte del cuerpo. | 3 ... N |
| Next | O be some other name! What's in a name? That which we call a rose By any other word would smell as sweet. | ¡Ah, ponte otro nombre! ¿Qué tiene un nombre? Lo que llamamos rosa sería tan fragante con cualquier otro nombre. | 3 ... N |
| Next | So Romeo would, were he not Romeo call'd, Retain that dear perfection which he owes Without that title. Romeo, doff thy name, and for thy name, which is no part of thee, Take all myself. | Si Romeo no se llamase Romeo, conservaría su propia perfección sin ese nombre. Romeo, quítate el nombre y, a cambio de él, que es parte de ti, ¡tómame entera! | 3 ... N |

FIG. 12B

```
<html>
  <head>
    <title>English Subtitles</title>

1210 ─┤   <style>
         <link rel="stylesheet" type="text/css" media="screen" href="laptop_format.css">
         <link rel="stylesheet" type="text/css" media="handheld" href="mobile_format.css">
      └  </style>

1212 ─┤   <script type="text/javascript">
            function polling_script() {       ── 1214
              if (polling_interval met) {
                establish asynchronous connection with Server;
                download any new data from ControlledChannelFile[current_channel] with any new polling interval;
                write any new data to self and render and/or execute as applicable;
              }
              :
              :
            }
      └   </script>

</head>

<body onload="polling_script()">

<div id="display_area">
        <div id="current_data_unit">
1216 ─┤     <p><span class="speaker">JULIET</span>: O Romeo,
            Romeo, wherefore art thou Romeo?</p>
            <p>Deny thy father and refuse thy name;</p>
            <p>Or, if thou wilt not, be but sworn my love,</p>
            <p>And I'll no longer be a Capulet.</p>
        </div>
      </div>
                                           1218
        <div id="links">                    ╱
          <a href="[URI - End-User Navigated File for English Synopsis]">English Synopsis</a>
          <a href="[URI - Controlled-Channel File for Spanish subtitles]">Spanish Subtitles</a>
          <a href="[URI - menu file]">Menu</a>
        </div>
                                                  1220
  </body>                              1222
  </html>
```

FIG. 12C

```
<html>
<head>

<script type="text/javascript"> function poll() { if ( document.getElementById('do_poll').value ) {          ――― 1224
            var Monitor = new XMLHttpRequest();                              1228
            Monitor.onreadystatechange = function() {                       /
                if (Monitor.readyState == 4 && Monitor.status == 200) {
                    if (document.getElementById('current_data_unit').innerHTML !=
                    Monitor.responseText) {
                        document.getElementById('current_data_unit').innerHTML =
                        Monitor.responseText;                                    1228
                    }                                                           /
                }                            1230
            }                               /
            Monitor.open("GET", "[URI – ProxyFile[channel]]", true);
            Monitor.send(null);
        }
        else {
            clearInterval(start_poll);
        }
    } function polling_script() {
1231 ―――― polling_interval = document.getElementById('polling_interval').value;
        start_poll = setInterval("poll()", polling_interval);
    }

</script>

</head>

<body onload="polling_script()">
                                                                    1232
    <form>                                                         /
        <input type="hidden" id="do_poll" name="do_poll" value="true" >
        <input type="hidden" id="polling_interval" name="polling_interval" value="500" >
    </form>
                         1234
    <div id="display_area">    /
        <div id="current_data_unit">
            Please take your seats, Ladies and Gentlemen. The performance is about to begin.
        </div>
    </div>

</body>
</html>
```

FIG. 12D

```
                          1236
wait (human or automated trigger to advance slide to new value Y) { if trigger occurs {     1238                    1240
                              /                       /
       for each channel C[1...N] {
          query field[C][Y] from Database and get new_polling_interval, and set both as part of file[C][Y];
          write file[C][Y] to ControlledChannelFile[C];
       } reset trigger loop to wait for next trigger
  \
}  \
     1242
```

FIG. 12E

```
while ( Sloop_control == 1 ) { if (receive request from End-User Device X for Controlled-Channel File Y) {
        serve Controlled-Channel File Y to End-User Device X;
    } if (receive request from End-User Device X to register Listener X for Channel Y) {
        add address of Listener X to list of registered listeners for Channel Y;
    } if (receive request from Listener X to deregister) {
        remove Listener X from list of registered listeners for Channel Y;
    } if (receive alert from Control Process that new data unit was written to Controlled-Channel File Y) {
        prepare lightweight notice that new data unit is available on Channel Y;
        push lightweight notice to addresses of all registered listeners for Channel Y;
    } if (receive asynchronous request from End-User Device X for current Channel Y data unit) {
        serve current Channel Y data unit asynchronously to End-User Device X;
    } if (receive instruction from Control Process to terminate data transport) {
        remove all listeners from lists of registered listeners;
        Sloop_control = 0;
    }

```
if (End-User directs display of Channel Y) {
    request and download Controlled-Channel File Y from Server;
    render and display Controlled-Channel File Y;
    run Listener process for Channel Y {
        register Listener with Server for Channel Y;
        while ( Sleep_control == 1 ) {
            listen for updates;
            if ( notice arrives from Server that new data unit is available on Channel Y ) {
                send request to Server for asynchronous download of current Channel Y data unit;
                download current Channel Y data unit from Server and display;
            }
            if ( End-User directs display of different channel ) {
                send request to Server to deregister Listener;
                Sleep_control = 0;
            }
        }
    }
}
```

SYSTEM AND METHOD OF TRANSMITTING DATA OVER A COMPUTER NETWORK INCLUDING FOR PRESENTATIONS OVER MULTIPLE CHANNELS IN PARALLEL

CROSS-REFERENCE TO RELATED APPLICATIONS

This application is a continuation of U.S. patent application Ser. No. 12/837,451, filed Jul. 15, 2010 (pending), and also incorporates by reference and claims all rights of priority to Provisional Patent Application No. 61/225,885 filed on Jul. 15, 2009.

RESERVATION OF COPYRIGHT

A portion of this patent document contains material which is subject to copyright protection. The copyright owner has no objection to the facsimile reproduction by anyone of the patent document as it appears in the Patent and Trademark Office patent file or records, but otherwise reserves all copyright rights whatsoever.

BACKGROUND OF THE INVENTION

I. Field of the Invention

This invention relates to transmitting data, including[1] multiple channels of data, via a computer network from a point or points of origin to a plurality of end-users. It has numerous exemplary[2] embodiments, including real-time transmission of data pertaining to live events (such as performances, exhibitions, competitions, presentations, or tours), displays of audiovisual recordings (such as movies or television), advertising, coordinating group activities, or assisting the hearing or visually impaired. It makes use of computer networking technologies associated with the Internet and World Wide Web (the "iWeb").

[1] As used herein, the term "include," in all its conjugations and forms, means "include without limitation."
[2] Any thing or group of things referred to herein as "exemplary," an "example," "for example," or illustrative, or introduced by the term "such as," is included for purposes of illustration, and not to indicate that other, equally illustrative things, do not exist.

II. Background on Browsers, Structured Documents, and Client/Server Scripting A "browser" is a software application that enables its user, among other things, to locate, display, and interact with text, sound, and static and moving image files.[3] A browser can "download" (i.e., access) such files whether they are stored locally (on the same computer[4] as the browser) or remotely (on a separate computer). Such files may be stored at a remote Web site accessed via the Internet, on a remote computer within a local area network (a "LAN"), or in a file system stored locally on the same computer as the browser. A browser may locate and request to download a file by reference to the file's Uniform Resource Identifier ("URI").[5]

[3] As used herein, the term "file" refers to stored data. This is for ease of reference only, and in and of itself does not imply any specific type of data or structure for storing the data.
[4] As used herein, the term "computer" refers to an apparatus that includes the components of a central processing unit microprocessor (CPU), read only memory (ROM), random access memory (RAM), a basic input/output system software application (BIOS), an operating system software application (OS), data storage capacity, and some combination of input/output (I/O) devices (such as a screen (including a touchscreen) or other display medium, keyboard, mouse, trackpad, trackball, microphone, or audio speaker).
[5] See, e.g., T. Berners-Lee, R. Fielding, L. Masinter, *Uniform Resource Identifier (URI): Generic Syntax*, Request For Comments 3986, The Internet Society (2005), available at ietf.org/rtfe/rfc3986.txt (last accessed Jul. 15, 2009).

If a file is stored remotely, the browser requests and downloads it via a network connection with the computer on which the file is stored, using a network communication protocol such as the HyperText Transfer Protocol ("HTTP"). Network communication protocols provide a means for computers to communicate across networks. They set rules for how computers should identify and connect with each other, and how they should format data for transmission and receipt. Broad adoption of standardized protocols enables numerous heterogeneous computer systems to communicate seamlessly over a network. HTTP, for example, is a broadly adopted standard that is one of the primary protocols upon which the Web is based.[6]

[6] See, e.g., R. Fielding, J. Gettys, J. Mogul, H. Frystyk, L. Masinter. P. Leach, T. Berners-Lee, *Hypertext Transfer Protocol—HTTP/1.1*. Request For Comments 2616, The Internet Society (1999), available at w3.org/Protocols/rfc2616/rfc2616.txt (last accessed Jul. 15, 2009).

Browsers also "render" structured document files. A structured document file is a text file that, among other things, has been coded or annotated with a markup language. A markup language provides instructions for how text should be structured or formatted upon display.[7] A browser renders a structured document file by displaying it in accordance with the browser's interpretation of such instructions. One example of a markup language is the HyperText Markup Language ("HTML"). The majority of the content available on the Web has been coded in HTML or the related Extensible HyperText Markup Language ("XHTML"). XHTML is a reformulation of HTML in accordance with the Extensible Markup Language ("XML"), which is a specification for creating custom markup languages.[8] The term "markup language," as used herein, refers to HTML, XHTML, another XML-conforming markup language, or any markup language performing functions equivalent to those ascribed to markup languages herein.

[7] See, e.g. James H. Coombs et al. *Markup Systems and the Future of Scholarly Text Processing*, Communications of the ACM 30, at 933-47 (November 1987), available at xml.coverpages.org/coombs.html (last accessed Jul. 15, 2009).
[8] See, e.g., World Wide Web Consortium ("W3C"), *HTML 4.01 Specification*, Dec. 24, 1999, available at w3.org/TR/html401/(last accessed Jul. 15, 2009); W3C, XHTML™ 1.0 *The Extensible HyperText Markup Language*, Jan. 26, 2000 recommendation revised Aug. 1, 2002, available at w3.org/TR/xhtml1/ (last accessed Jul. 15, 2009). XML has been gaining popularity on the Web as well, and is itself a subset of the Standard Generalized Markup Language ("SGML") of the International Organization for Standardization (ISO 8879: 1986 SGML). See, e.g., W3C, *Extersible Markup Language (XML)* 1.1, Aug. 16, 2006, available at w3.org/TR/xml11/(last accessed Jul. 15, 2009).

A structured document file also may contain one or more hyperlinks. A hyperlink may designate, among other things, the URI of another structured document file.[9] When activated by a browser's user, such a hyperlink induces the browser to download and render the designated file in place of, or in addition to, the initial file that contains the hyperlink. A browser thereby enables its user to traverse a plurality of hyperlinks, and thereby "browse" or "surf" a collection of interlinked structured document files.

[9] See, e.g., *HTML 4.01 Specification*, supra note 8, §12 (Links), available at w3.org/TR/html401/struct/links.html.

A structured document file also may contain or be accompanied by a client-side script. A client-side script is a program or set of instructions that the browser and the computer it resides on (jointly and individually referred to as a "client") execute upon downloading the associated structured document file, or upon a later triggering event, such as the user's activation of a hyperlink designating the client-side script.[10]

[10] See, e.g., *HTML 4.01 Specification*, supra note 8. §18 (Scripts), available at w3.org/TR/html401/interact/scripts.html.

A structured document file also may contain a server-side script. A server-side script is a program that is executed by the computer or software application that is "serving" (i.e., transmitting) the structured document file to the browser. Execu tion of the server-side script is prompted by the browser's request to download the structured document file.[11]

[11] See, e.g. Robert E. Irie, *Web Site Design*, The Internet Encyclopedia, vol. 3, 768, 770-71 (Hossein Bidgoli ed., 2004).

Browsers widely available today include, for example, Internet Explorer, Firefox, Safari, Chrome, and Opera. It will be appreciated by one skilled in the art, however, that the invention may be practiced with other software applications. The term "browser," as used herein, refers to any software application capable of performing functions equivalent to the functions ascribed to browsers above, whether or not they are its primary functions.

It will be appreciated by one skilled in the art that the invention may be practiced also by means of a "push" design not typically associated with standard browser implementations. A push design differs from its opposite, a pull design, in that the client passively listens for initiation of a file transfer from a remote server, instead of actively requesting it. Examples of broadly adopted communication protocols with push designs include the Short Message Service ("SMS") on the GSM wireless phone network, and SMTP-based Internet email ("Simple Mail Transler Protocol"). The "Server-Sent Events" and "Web Sockets" protocols, which are still in development, are examples of draft specifications of push standards intended for adoption by mass-distribution Web browsers.[12]

[12] See, e.g. W3C, Server-Sent Events. W3C. W3C Working Draft, Apr. 23, 2009, available at w3.org/TR/2009/WD-eventsource-20090423 (last accessed Jul. 12, 2010); *The Web Sockets API*, W3C Working Draft, Apr. 23, 2009, available at w3.org/TR/2009/WD-websockets-20090423 (last accessed Jul. 12, 2010); Ian Hickson, *The Web Socket Protocol, draft-hixie-thewebsocket-protocol-22* (Jul. 13, 2009), available at tools.ietf.org/html/draft-hixie-theweb-socketprotocol-22 (last accessed Jul. 12, 2010).

III. Prior Art

Various prior art has addressed or touched upon the transmission of successive data units via a computer network, including for supplementing live events or presentations of audiovisual recordings, for advertising, for coordinating group activities, or for assisting the hearing impaired.

U.S. Pat. No. 5,739,869 to Markle et al. (1995) describes a multichannel electronic libretto display apparatus and method that is "broadcast only" (Markle at col. 1, line 57)—i.e., its network communications travel in one direction, from the data source to the end-user recipients. The Markle patent relies on a specialized transmission protocol to send all data channels in a single data packet. The entire packet, with all channels, must then be loaded and stored by every end-user device in a memory butffer in advance of display. A second data packet containing a "display cue" must then be transmitted to all end-user devices, to trigger each end-user device to display the portion of the previously downloaded packet that corresponds to the channel the end-user has chosen to view.

A limitation of the Markle patent's system is that "[t]he number of channels available is dependent on the buffer size incorporated into the display unit." (Markle at col. 5, line 25-26.) The system also is limited to transmitting a "preselected sequence of text." (Id. at cols. 8-10.) In addition, all channels must proceed in a synchronized manner, with each display cue sent to every end-user device simultaneously. Nor is a means provided to integrate the preselected sequence of text with other content that end-users may browse in a self-directed fashion. The system also relies on custom communication protocols and end-user device configurations, increasing expense and limiting practicality of implementation.

U.S. Pat. No. 6,760,010 B1 to Webb et al. (2004) discloses a wireless electronic libretto display apparatus and method that, like the Markle patent, is limited to one-way communications. The Webb patent improves upon the Markle patent's transmission protocol by appending a cyclical redundancy checksum ("CRC") to the data packets, as a means of avoiding data corruption in electromagnetic wireless transmissions. Upon receipt of a data packet, each end-user device recalculates the CRC itself, and if the recalculated CRC does not match the CRC received, the device discards the packet and waits for it to be retransmitted.

While introduction of the CRC process improves accuracy of data transmissions, the Webb patent otherwise describes a system that remains essentially the same as that of the Markle patent, and remains subject to equivalent limitations. The CRC also introduces new limitations insofar as data packets must be rebroadcast repeatedly by the main control unit and transmitter, and the network communication protocols and end-user device configuration must be more specialized. The Webb patent explains that it relies exclusively on one-way transmissions because "[t]wo-way communications are not practical" due to the "large bandwidth required, the complicated protocol and the cost of the implementation, particularly with large installations." (Webb patent at col. 1, lines 39-43.) That statement no longer describes the state of the art accurately, thanks to rapid advancement of computer networking technologies, including the recent availability of inexpensive mass-market wireless networking systems and devices.

U.S. Pat. No. 6,785,539 B2 to Hale et al. (2004), the continuation U.S. Pat. No. 7,224,967 to Hale et al. (2007), and the related continuation application U.S. application Ser. No. 11/679,147 by Hale et al. (filed Feb. 26, 2007) (collectively, the "Hale Patents") describe a system and method of wirelessly triggering portable devices to display data to end-users for various purposes, including to provide captioning for a performance or attraction. The Hale Patents' system relies upon "pre-loading" and "pre-programming" end-user devices with the content to be displayed. Thereafter, a series of specialized data packets are transmitted to the end-user devices, with each packet containing instructions to "trigger" the end-user-devices to display the appropriate portion of the content with which they already have been loaded. The need to pre-load the end-user devices in advance of display, and the reliance upon specialized communication protocols, are cumbersome and limiting. Data units cannot be created and transmitted in real time in response to occurrences during the course of a live event. In addition, the expense and difficulty of implementing the system described by the Hale Patents are increased.

U.S. Pat. No. 5,648,789 to Beadles et al. (1997) describes wireless transmission of captions for hearing-impaired attendees at theatrical and similar performances. Its teachings, however, are limited to a method whereby each end-user wears a specialized apparatus in the form of eyeglasses that superimposes the captions within the end-user's field of vision. The apparatus described has certain inherent limitations, including that it only can display from 60 to 90 alphanumeric characters at a time. (Beadles at col. 3, lines 37-38.) Nor does the Beadles patent's system provide for transmitting multiple channels, or integrating the captions with content that end-users may browse on a self-directed basis. In addition, the fact that the specialized eyeglasses apparatus is not yet widely used or available to consumers imposes cost and practicality limitations.

U.S. Pat. No. 6,396,500 to Qureshi et al. (2002) describes a method for converting the format of a series of slides that have been created with a slide presentation program, such as "Power Point," into a series of corresponding HTML pages for successive display in a browser or equivalent viewing facility. By use of the well recognized HTML standard and widely available browser applications, the Qureshi patent overcomes some of the cost and practicality limitations associated with other prior art discussed above. However, it describes no means for real-time centralized control and coordination of the content displayed by multiple distributed end-user devices.

The Qureshi patent's method therefore is not useful for supplementing live events. It is ill-suited for this, as well, because it describes no means to transmit multiple channels in parallel. In addition, it transmits entire HTML pages in series, with each HTML page constituting a single slide. This transmits more data than necessary, causing suboptimal transmission times and network resource expenditures. Each successive HTML, page also must be reloaded by the browser, a process that is a further source of delay and tends to disturb or disrupt the browser's display medium. Delay is especially significant in the live event context, where supplemental data transmissions typically must keep close pace with numerous, short occurrences during the longer event.

SUMMARY OF THE INVENTION

In one general aspect, the invention is a system and method of transmitting data via a computer network from a point or points of origin to a plurality of end-users, including for presentations over multiple channels. Exemplary embodiments include transmitting data pertaining to live events, audiovisual recordings, advertising, coordination of group activities, and/or assisting the hearing or visually impaired.

The transmissions may be prompted by a human-operated or automated means of control by changing a structured document file or proxy file on a server. End-users may download the structured document file from the server, and then poll the server on an automated basis to detect and download changes to the file or its proxy as and when they occur. Alternatively, the changes may be pushed to end-users by the server.

Successive arrays of associated data units may be transmitted over a plurality of channels, in parallel, by successively changing a plurality of structured document files or their proxies. The transmission of each successive array, in its entirety, may be coordinated to coincide with each of a series of occurrences during an encompassing live event. Alternatively, data units may be transmitted over one or more channels independently of and asynchronously with transmissions over other channels.

Where a plurality of channels are transmitted, end-users may change channels at will by downloading a different structured document file. Controller-prompted transmissions, which end-users receive passively, also may be integrated with a facility whereby end-users may browse one or more structured document files in a self-directed sequence and pace, and may switch back and forth at will between passive receipt and self-directed browsing of data transmissions.

An advantage of the present invention, relative in particular to the Qureshi patent, is that it transmits only one HTML page (or other form of structured document file) per channel, and thereafter transmits just modifications to a portion of that page. This reduces the amount of data that must be transmitted for each successive slide or other data unit. Also, each successive data unit is received and displayed by the end-user device without its browser performing a full reload of the HTML page, eliminating the potential delay and disruption associated with reloading. These advantages may be achieved by means of two-way network communication protocols (in contrast to the Webb patent), and Ajax (Asynchronous Java Script and XML) or equivalent programming methods that were not well recognized until recently.[13]

[13] See, e.g., Jesse James Garrett, *Ajax: A New Approach to Web Applications*, Feb. 18, 2005, available at adaptivepath.com/ideas/essays/archives/000385.php (last accessed Jul. 15, 2009); Christopher L. Merrill, *Performance Impacts of AJAX Development*. Jan. 15, 2006, available at webperformance-inc.com/library/reports/AjaxBandwidth (last accessed Jul. 15, 2009); Mylene Mangalindan and Rebecca Buckman, *New Web-based Technology Draws Applications*, Investors, Wall St. J., Nov. 3, 2005, at B1.

Another advantage of the present invention is that it permits centralized control and coordination of the display of data units by a plurality of end-user devices.

Another advantage of the present invention is that the sequence of data units to be transmitted does not have to be preselected. Moreover, data units can be created immediately prior to transmission, in real-time coordination with the flow of an external live event.

Another advantage of the present invention is that it permits data units to be transmitted over multiple channels in parallel. Moreover, in contrast to the system described by the Markle patent, the number of channels that may be made available is not limited by the capacities of end-user devices, and end-user devices do not have to receive more than one channel of data units at a time.

Another advantage of the present invention is that data units may be transmitted along parallel channels in synchrony or not, at the option of the controller.

Another advantage of the present invention is that it permits end-user recipients to switch channels at will, or to monitor a plurality of channels at the same time.

Another advantage of the present invention is that it integrates centrally controlled data-unit transmission, which end-users receive passively, with sources of content that end-users may browse on a self-directed basis. Moreover, it permits end-users to switch back and forth between these two methods of accessing content.

Another advantage of the present invention is that it does not require end-user devices to be pre-loaded, pre-programmed, or preconfigured.

Another advantage of the present invention is that it may be implemented with a variety of standard and inexpensive hardware and software platforms and protocols. These include widely recognized communications protocols and mass-market end-user devices that consumers already own for alternative purposes and often carry on their persons. This decreases the cost and increases the practicality of implementing the present invention relative to prior art that has sought to accomplish similar objectives.

The above aspects, advantages and features are of representative embodiments only. It should be understood that they are not to be considered limitations on the invention as defined by the claims. Additional features and advantages of the invention will become apparent in the following description, from the drawings, and from the claims.

BRIEF DESCRIPTION OF THE DRAWINGS

FIG. 10 illustrates how data units appropriate for supplementing a sporting event may be stored in a database, and how a controller may transmit such data units over a single channel, in a spontaneous sequence that responds to the event as it progresses.

FIG. 11 illustrates how data units appropriate for supplementing a theatrical event may be stored in a database, and how a controller may transmit such data units over a plurality of channels, in parallel, in a predetermined sequence as the event progresses.

FIG. 12B shows pseudocode for an exemplary controlled-channel file, including an embedded polling script.

FIG. 12C shows pseudocode for an exemplary controlled-channel file, including an embedded polling script that uses the XMLHttpRequest Object and polls a proxy file.

FIG. 12D shows pseudocode for an exemplary read/write function for a controller application.

FIG. 12E shows pseudocode for an exemplary push implementation of a server's transport process.

FIG. 12F shows pseudocode for an exemplary push implementation of an end-user device's receipt process for a controlled-channel file.

DETAILED DESCRIPTION OF THE PREFERRED EMBODIMENTS OF THE INVENTION

I. Configuration of the System

A. The Network

Figure 1:
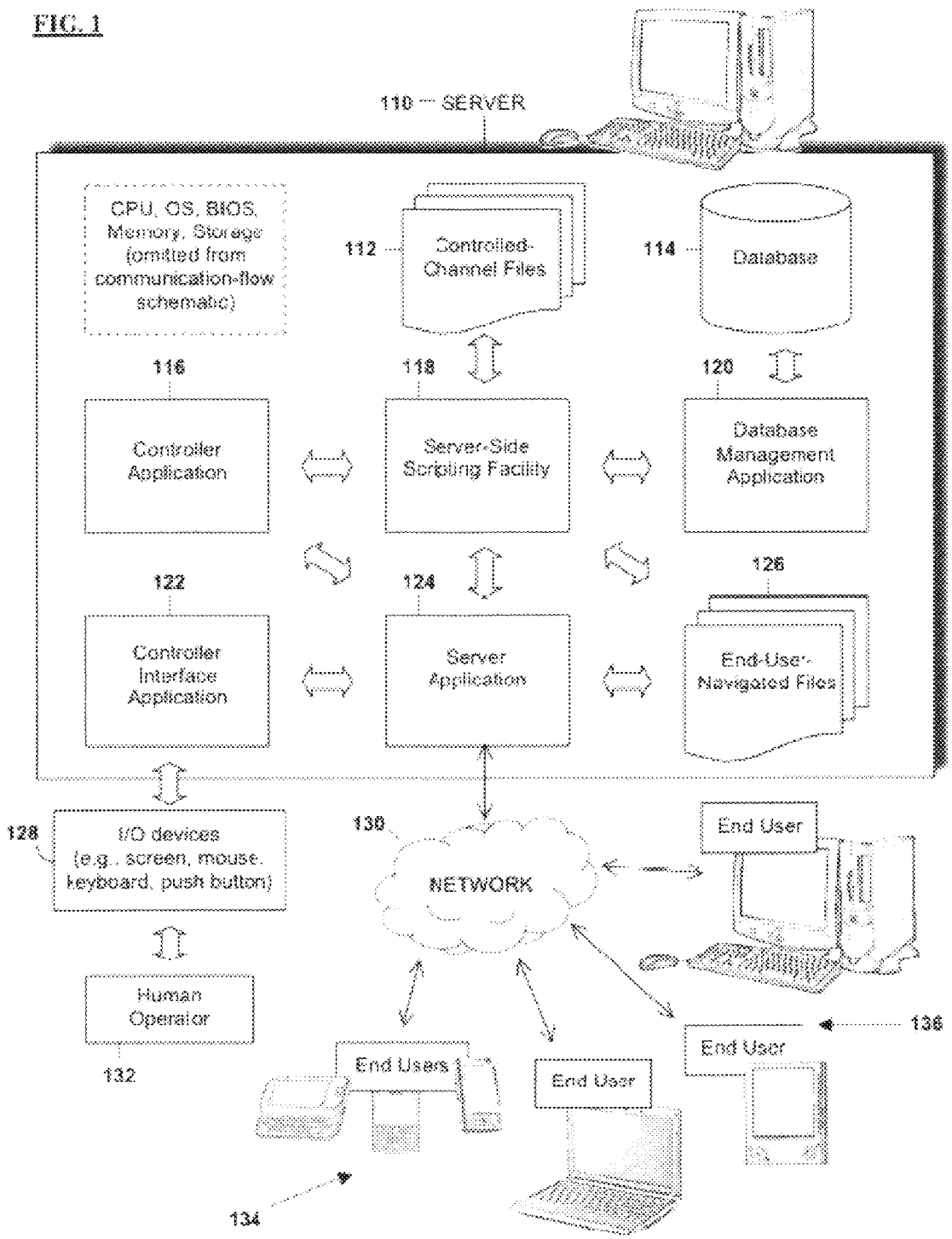
FIG. 1 shows an exemplary configuration of the invention's operating environment in which a human operator uses the controller interface application to direct the controller application, both applications run on the same computer, and communications between them are mediated by the server application.

FIG. 1 shows an exemplary configuration of an operating environment for the invention, including communication flows among components. The computer network over which data is transmitted (the "Network") 130 may include the Internet, a wired LAN, a wireless LAN, a cellular telephone network, a wireless wide area network (a "WWAN"), combinations of such networks, or an equivalent. The network communication protocols to be used may include one or more protocols chosen from among the set of protocols known as the Internet Protocol Suite ("TCP/IP") (including the Transmission Control Protocol ("TCP"), the Internet Protocol ("IP"), the User Datagram Protocol ("UDP"). HTTP, and the File Transfer Protocol ("FTP")) or any equivalent protocols, including, for example, the Server-Sent Events protocol or Web Sockets protocol, which operates as a layer on top of TCP/IP, or the SMS or SMTP protocols. Where a wireless LAN is used, it may be based upon the IEEE 802.11x standards for wireless networking via radio wave transmissions, also known as "Wi-Fi," or upon any equivalent.

B. The Data and Server

The data to be transmitted may include digital representations of text, sound, static or moving images, or combinations thereof. The data may be stored on and transmitted from a computer the "Server") 110 capable of running a server application (such as Apache, LiteSpeed, Lighttpd, Microsoft IIS, Sun Java System Web Server, IBM HTTP Server. Abyss, or an equivalent) (the "Server Application") 124. The Server Application 124 communicates based on one or more network communication protocols (such as HTTP, for example), and executes or recruits the Server 110 to execute, by means of a server-side scripting facility 118, programs written in a server-side scripting language (such as PHP, ASP, Perl, Python, Lasso or an equivalent). Where associated data units to be transmitted are prepared in advance of transmission (as, for example, with theatrical subtitles, certain sports statistics, or advertisements), they may be stored on the Server by use of a database management application 120, such as MySQL, PostgreSQL, SQLite, Microsoft SQL, Oracle, or an equivalent. Data stored in such manner will be referred to herein as the "Database" 114.

C. Means of Control

Figure 2:
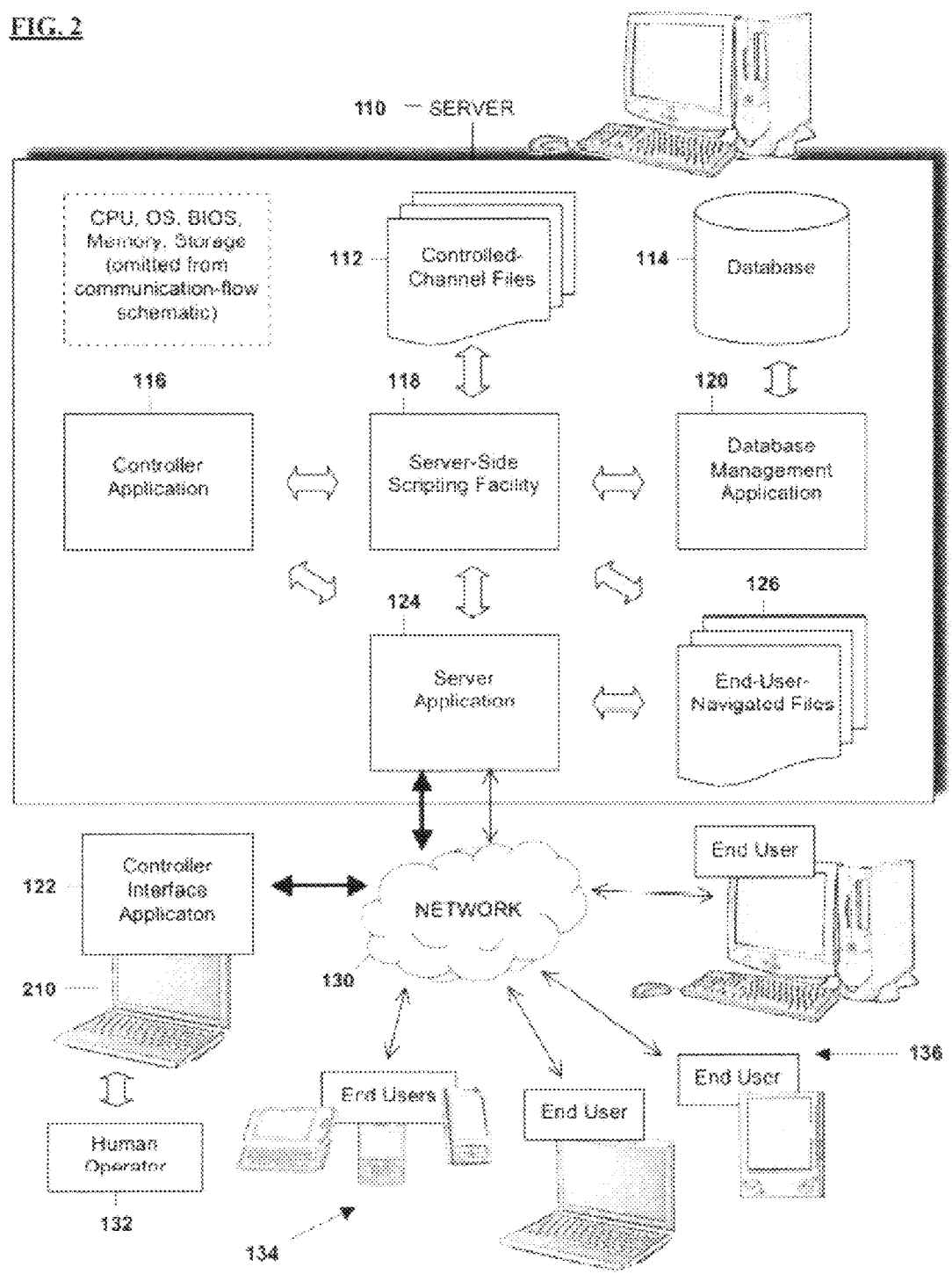
FIG. 2 shows an exemplary configuration of the invention's operating environment in which the controller interface application and the controller application run on separate computers and communicate by means of a network connection, enabling a human operator to direct the controller application remotely by means of the controller interface application, mediated by the server application.

The Server's 110 transmission of data may be controlled through a software application (the "Controller Application") 116 that prompts the Server Application 124 to execute instructions, written in one or more server-side scripting languages, that have been stored on the Server 110. The Controller Application 116 may be run entirely on the Server itself, as shown in FIG. 1. Alternatively, as shown in FIG. 2, the Controller Application 116 also may be directed from a separate computer 210 that communicates with the Server 110 via HTTP and/or similar or complementary network communication protocols, thereby permitting the Server's 110 transmissions to be controlled remotely. From the descriptions in this patent document, it will be apparent to one skilled in the art how to create such a Controller Application.

Figure 4:
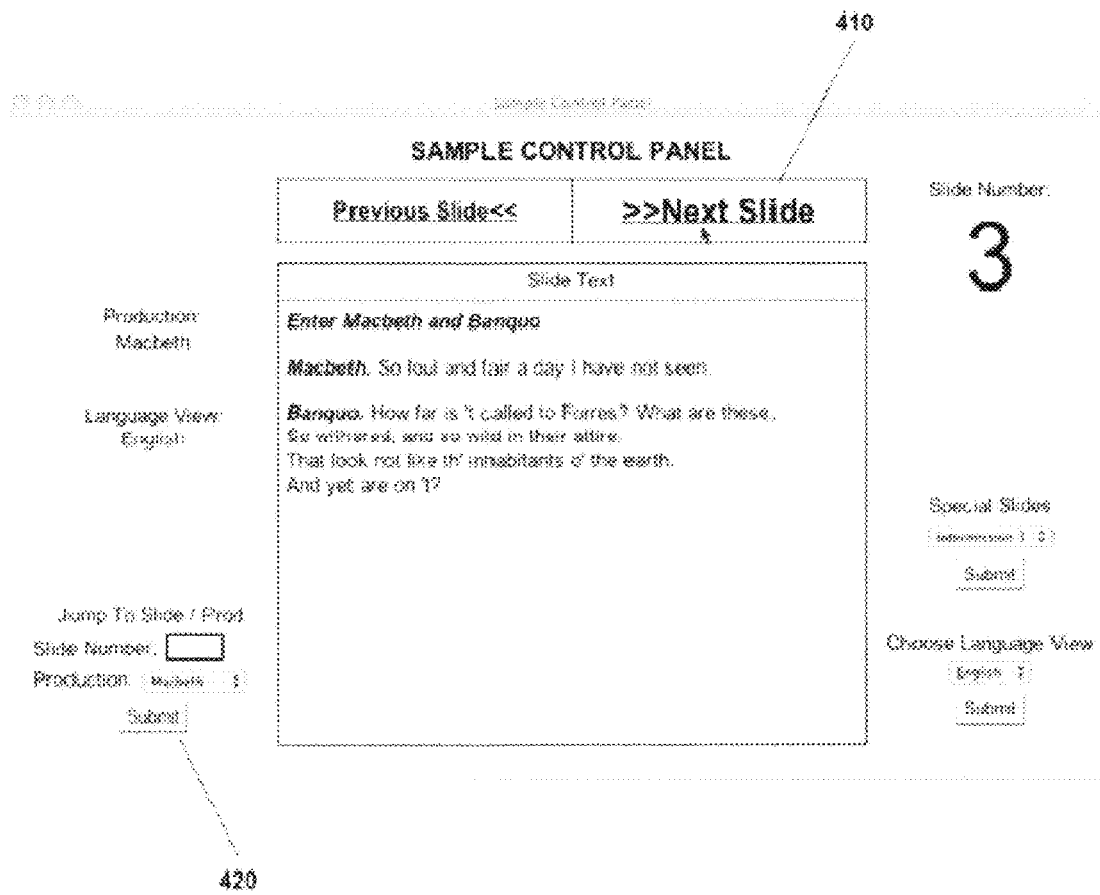
FIG. 4 shows an exemplary graphical user interface by which a human operator may direct a controller application.

As shown in both FIG. 1 and FIG. 2, a human operator 132 may use the Controller Application 116 to direct the Server's 110 transmission of data units in real time. In such case, the Controller Application 116 may encompass one or more structured document files written in a markup language, and containing embedded code written in a server-side scripting language. Such structured document files, rendered into human readable format and displayed through a viewing medium, such as a screen 128 (FIG. 1), by a browser or equivalent software application (a "Controller Interface Application") 122, may serve as a graphical user interface for the human operator. FIG. 4 illustrates such a graphical user interface. Referring again to FIG. 1, the human operator 132 may direct the Controller Application 116 via the Controller Interface Application 122 and by means of one or more input devices such as a keyboard, mouse, push button, or equivalent 128.

Figure 3:
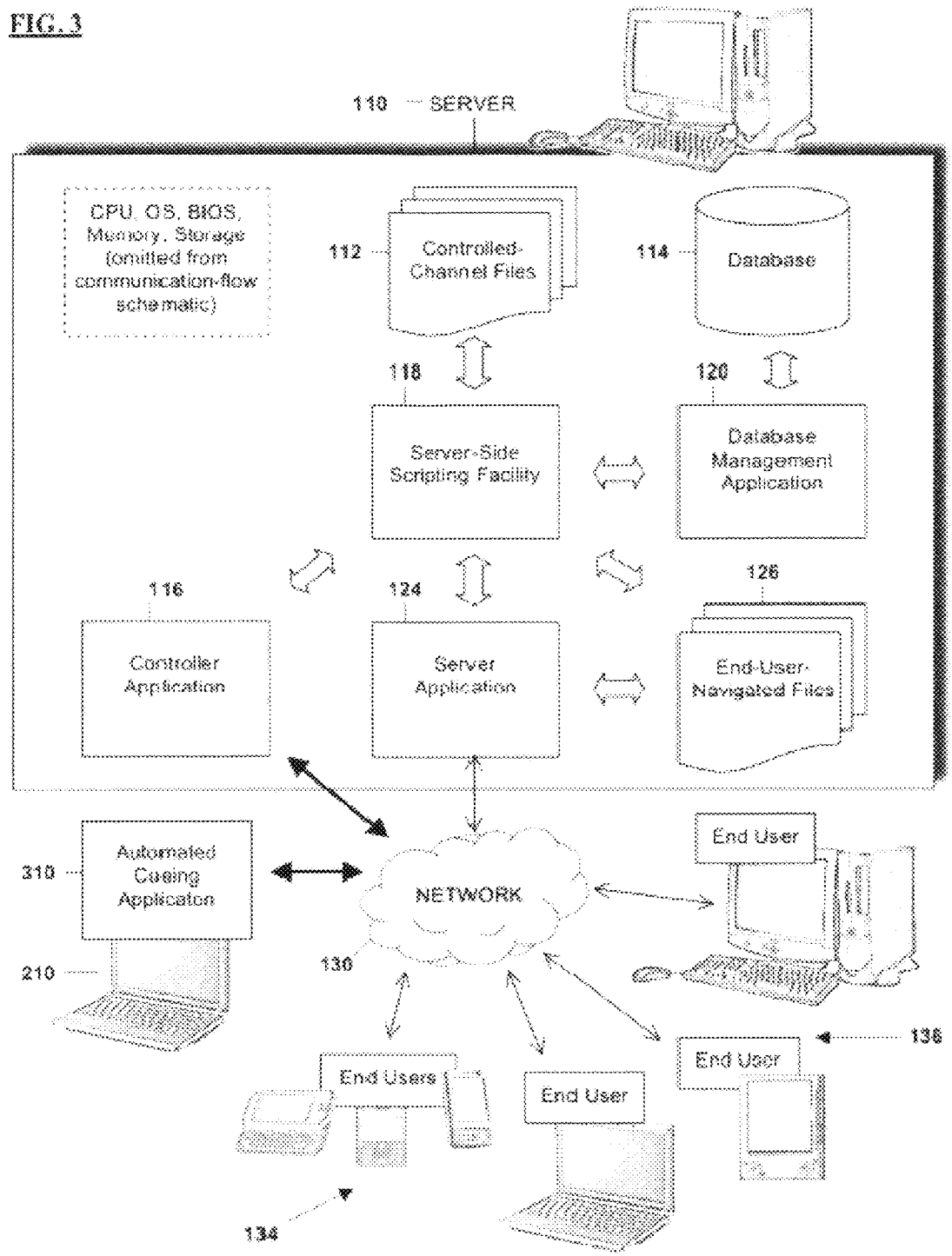
FIG. 3 shows an exemplary configuration of the invention's operating environment in which an automated cueing application directs the controller application, with the two applications being run on separate computers and communicating remotely via a network connection, in this example without intermediation by the server application.

Alternatively, as illustrated by FIG. 3, the Controller Application 116, on an automated basis (i.e., without real-time direction by a human operator), may direct the Server 110 to transmit data units. For example, the Controller Application 116 may direct the Server 110 to transmit successive data units in accordance with predetermined timing cues. Or, for example, the Controller Application 116 may direct the Server 110 to transmit successive data units in accordance with cues or data received from separate electronic systems or software applications, each referred to herein as a "Cueing Application" 310. The Cueing Application 310 may comprise or incorporate, and the term encompasses, for example, systems to cue theatrical lighting or set changes; systems for playback or display of audio or video recordings; speech and other sound recognition systems; computer-assisted stenographic systems; systems for control of musical instruments (including, for example, systems using the musical instrument digital interface protocol (MIDI)); or systems for detecting geographic position, including the United States' Global Positioning System ("GPS") or alternative location-sensitive systems.[14]

[14] See, e.g., gps.gov (U.S. Gov. GPS Web Site) (last accessed Jul. 15, 2009); Jenna Wortham. *Cellphone Locator System Needs No Satellite*, N.Y. Times. May 31, 2009, at B4.

Automated and human operated methods of directing the Server 110 to transmit data units also may be integrated, such that each is used to direct a subset of a larger set of transmissions.

D. End-User Receipt

Referring to FIGS. 1, 2, and 3, the end-users 136 may receive data transmissions with any computer (an "End-User Device") 134 that is running a browser or equivalent software application capable of (i) communicating with the Server 110 by means of a mutually recognized network communication protocol, such as HTTP and/or similar or complementary protocols, (ii) rendering text written in a markup language, and (iii) executing instructions written in a client-side scripting language, such as JavaScript, client-side VBScript, or any equivalent. Appropriate End-User Devices 134 may include, for example, desktop, laptop, or tablet personal computers; "netbooks";[15] smart phones; personal digital assistants; portable audio or video file players; portable game players; portable electronic readers;[16] or equivalent devices. For embodiments in which the Server 110 transmits data units that are or include sound files (such as MP3 files) or static or moving image files (such as JPEG or WMV files), the End-User Devices 134 must have browsers that are capable of actuating such files, either alone or with aid of one or more helper-applications running on the End-User Devices 134. (Examples of such helper-applications in wide use today include RealPlayer, QuickTime, Windows Media Player, and Adobe Reader.)

[15] Concerning the recent development of a "netbook" market see, e.g., Matt Richtel, *Smaller PCs Cause Worry for Industry*, N.Y. Times, Jul. 21, 2008; *Samsung Seeks Entry to U.S. Laptop Arena*. Yun-Hee Kim. Wall St. J., Oct. 15, 2008, at B8.
[16] On the growing market for electronic readers, see, e.g., Brad Stone and Mokoto Rich. *Turning Page, E-Books Start to Take Hold*, N.Y. Times, Dec. 23, 2008, at A1.

II. Operation of the System

A. Controller-Prompted Transmission Over a Single Channel

1. Controlled-Channel File

Figure 5:
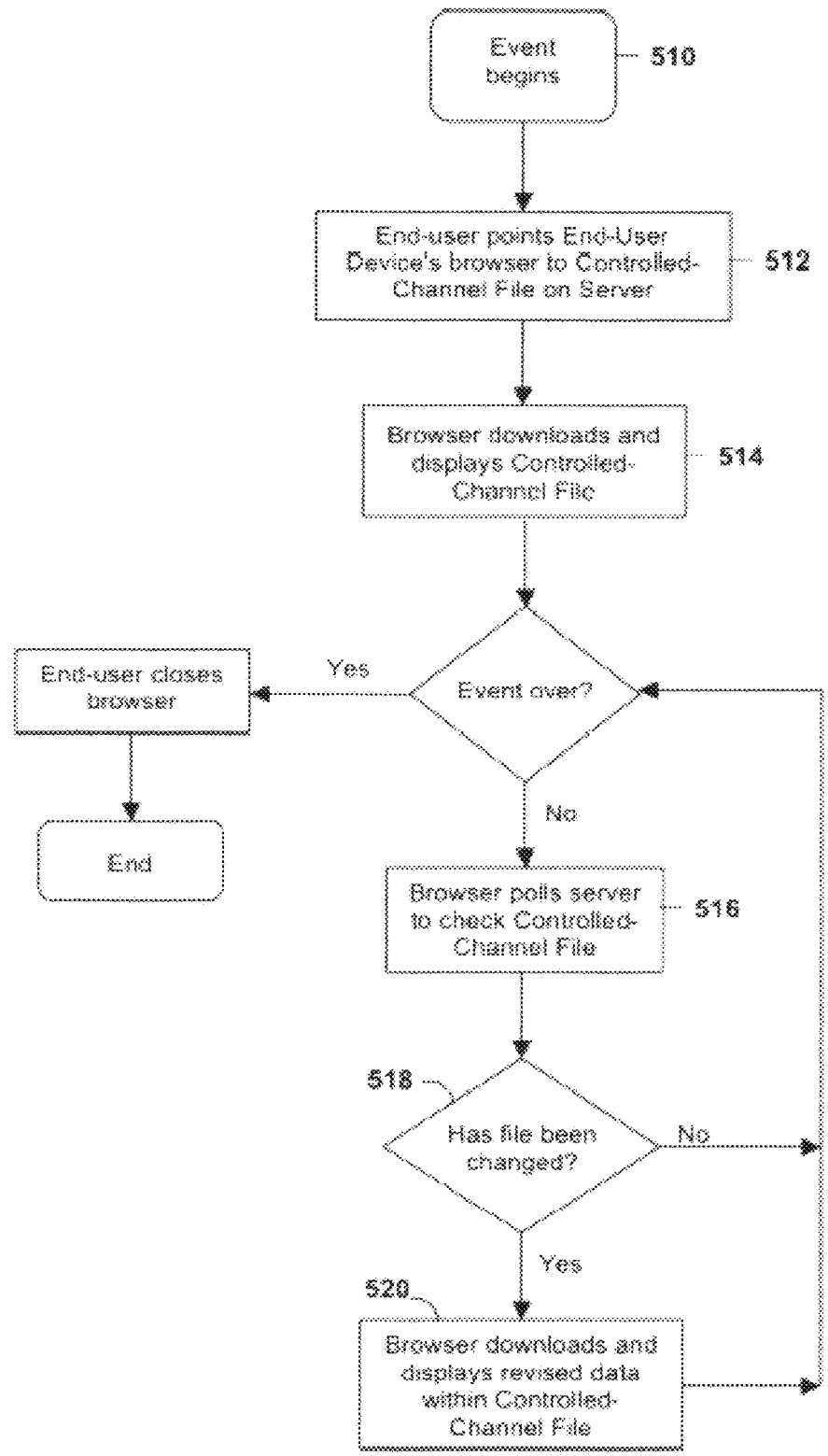
FIG. 5 shows an exemplary process by which a controlled-channel file may be downloaded by an end-user device and serve as a single channel for an end-user to receive transmission of successive data units to supplement a live event.

FIG. 5 illustrates the process by which an end-user may receive transmission of a single channel of data units to supplement a live event, via a file designated for receipt of controller-prompted transmissions (a "Controlled-Channel File").

After the event begins 510, the end-user causes an End-User Device's browser to download the Controlled-Channel File from the Server 512, 514 (by means of a mutually recognized network communication protocol, such as HTTP and/or similar or complementary protocols). An end-user may access a Controlled-Channel File by inputting its URI into the End-User Device's browser 512. Alternatively, where appropriate to a particular embodiment, the end-user may access a Controlled-Channel File by activating a hyperlink contained in another, associated file 512.

Pseudocode for an exemplary Controlled-Channel File is shown in FIG. 12B. The Controlled-Channel File is a structured document file written in a markup language recognized by the End-User Device's browser. It contains the initial data unit 1216 (FIG. 12B) of a plurality of data units to be transmitted. Upon being downloaded, the appropriate portions of the Controlled-Channel File, including the initial data unit, are displayed and/or otherwise processed by the End-User Device 514 (FIG. 5).

2. Style Sheet Links

Referring to FIG. 12B, the Controlled-Channel File may contain one or more links 1210 that prompt the End-User Device's browser to download, contemporaneously with the Controlled-Channel File, a style-sheet file, written in a style-sheet language such as Cascading Style Sheets ("CSS"), Extensible Stylesheet Language ("XSL"), or an equivalent.[17] The style-sheet file provides directions to the browser about how to interpret the markup language in which the Controlled-Channel File is coded, and permits specification of numerous style and formatting parameters.[18] The Controlled-Channel File may link to a plurality of style-sheet files 1210, with each style-sheet file tailored for, and directed to be used for, a different make of End-User Device or browser. The Controlled-Channel File's appearance as viewed across heterogeneous End-User Devices and browsers may thereby be conformed, broadening the scope of end-users to whom such an embodiment may be made available.

[17] See, e.g. *HTML 4.01 Specification*, supra note 8, §14.3.2 (Specifying External Style Sheets), available at w3.org/TR/html401/present/styles.html#h-14 (last accessed Jul. 15, 2009).
[18] See, e.g., W3C, *Cascading Style Sheets, Level 2 Revision 1* (CS 2.1) Specification. W3C Candidate Recommendation. Apr. 23, 2009, available at w3.orgrFR/CSS2/(last accessed Jul. 15, 2009); W3C, *Extensible Stylesheet Language (XSL) Version* 1.1, W3C Recommendation, Dec. 5, 2006, available at w3.org/TR/xsl11/ (last accessed Jul. 15, 2009).

3. Polling Script

Embedded within the Controlled-Channel File is a script 1212 or a link to a script (the "Polling Script"), written in JavaScript, client-side VBScript, or any equivalent, that is executed by the End-User Device's browser upon downloading the Controlled-Channel File. The Polling Script 1212 prompts the browser, each time a designated time interval has passed (the "Polling Interval") 1214, to poll the Server to ascertain whether the Controlled-Channel File has changed since expiration of the most recent Polling Interval 516, 518 (FIG. 5).

Alternatively or in addition, the Polling Script may prompt the browser to poll the Server to check one or more files on the Server other than the Controlled-Channel File, with such other files acting as surrogates or proxies for one or more portions of the Controlled-Channel File on the Server ("Proxy Files"). In such case, the Polling Script will compare the relevant portion(s) of a Proxy File on the Server with the corresponding portion(s) of the Controlled-Channel File on the End-User Device. FIG. 12C contains an exemplary Polling Script that polls a Proxy File 1230.

4. Controller-Induced Change on Server

Referring again to FIGS. 1 through 3, after one or more end-users 136 have downloaded a Controlled-Channel File 112 from the Server 110, a controller 132 (FIGS. 1, 2), 310 (FIG. 3) may alter the Server's copy of the Controlled-Channel File (or any relevant Proxy Files)[19].

[19] It will be understood, without need for repeated specification, that the processes discussed herein whereby a controller changes a Controlled-Channel File on the Server and an end-user receives transmission of the data corresponding to that change, may be implemented as well with a Proxy File serving in place of the Controlled-Channel File to make the new data available.

Most crudely, a human operator 132 (FIGS. 1, 2) may edit or replace a Controlled-Channel File on the Server with any of various standard text editing or FTP-client software applications, which are familiar to those skilled in the art.

Figure 6:
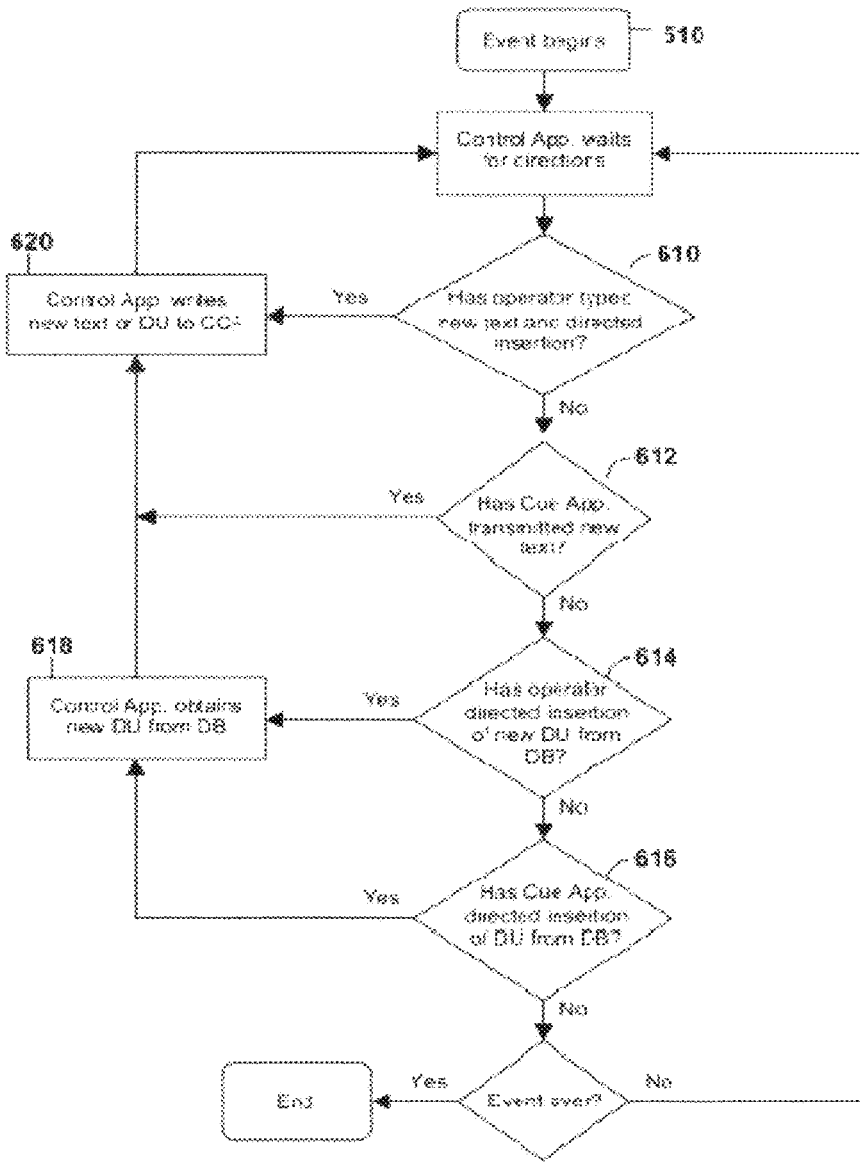
FIG. 6 shows an exemplary process by which a controller application, at the direction of a human operator and/or an automated cueing application, may write successive data units to a controlled-channel file to supplement a live event.

Greater flexibility may be provided by the Controller Application 116 (FIGS. 1-3), which may use server-side scripting and the document object model (the "DOM")[20] to edit the Controlled-Channel File on the Server 110 (FIGS. 1-3). Referring to FIG. 6, a Controller Application may enable a human operator to type new text 610 into a graphical user interface, and then, upon a cue by the human operator 610 (such as a mouse click, keystroke, or press of a push button, for example), the Controller Application may insert the new text into the Controlled-Channel File on the Server 620, or use the new text to overwrite a designated portion 1216 (FIG. 12B) of the Controlled-Channel File on the Server 620 (FIG. 6). The new text may itself be or contain a hyperlink to further data, including, for example, a sound file or a static or moving image file.

[20] See, e.g. W3C, *Document Object Model (DOM) Level 3 Core Specification, What is the Document Object Model?* (2004) available at w3.org/TR/DOM-Level-3-Core/introduction.html (last accessed Jul. 15, 2009).

Figure 7:
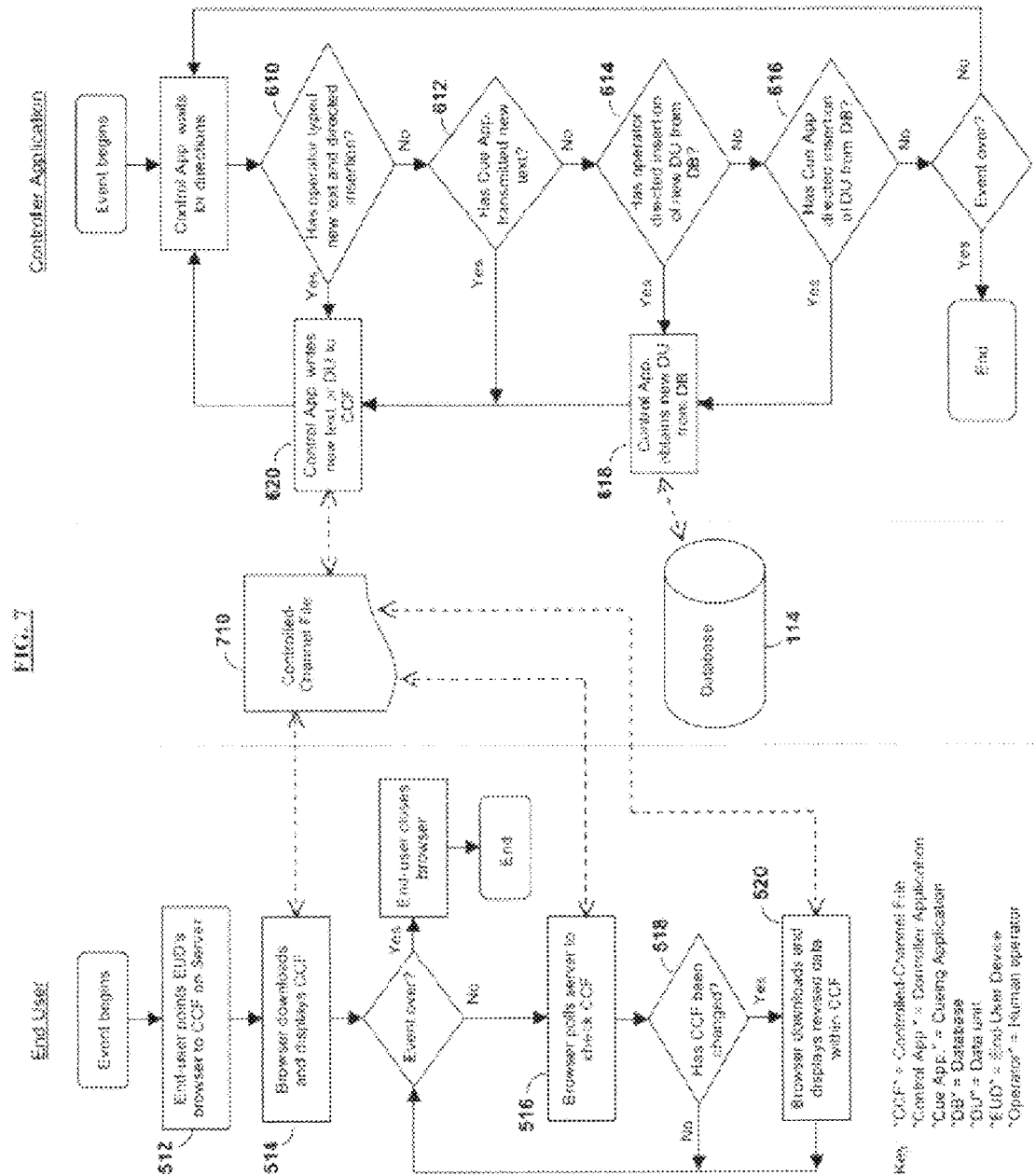
FIG. 7 shows an exemplary parallel process by which (1) a human operator and/or an automated cueing application may cause successive data units to be written to a controlled-channel file, and (2) an end-user may download and view the new data units as they are written to the controlled-channel file.

Alternatively, for example, the Controller Application 116 (FIGS. 1-3) may read from the Database 114 (FIGS. 1-3, 7) a specified data unit that has been preloaded into the Database 618 (FIGS. 6, 7), and then insert that data unit into the Controlled-Channel File on the Server or use it to overwrite a designated portion 1216 (FIG. 12B) of the Controlled-Channel File on the Server 620 (FIGS. 6, 7). The Controller Application's performance of this read/write function 618, 620 (FIGS. 6, 7) may be directed by a human operator's mouse click, keystroke, or press of a push button, for example 614 (FIGS. 6, 7), 410, 420 (FIG. 4). It also may be prompted, on an automated basis, by pre-programmed timing cues or cues from a Cueing Application 616 (FIGS. 6, 7), 310 (FIG. 3). Pseudocode for an exemplary read/write function for a Controller Application is shown by FIG. 12D.

Where the Controller Application is directed to read a data unit from the Database in order to write it to the Controlled-Channel File, that data unit may be specified by its absolute coordinates within the Database. This is illustrated in FIG. 10, where the controller's database calls 1014 designate absolute coordinates within the exemplary Database excerpt 1010a-d.

Alternatively, referring to FIG. 11, the data unit 1116a may be designated by its relative position with respect to another data unit 1114a within the Database. For example, the data unit 1116a may be designated by its relation to whichever data unit the Controller Application most recently has written to the Controlled-Channel File 1114a (FIG. 11), 1216 (FIG. 12B). In this manner, for example, the Controller Application may be directed to read from the Database 618 (FIGS. 6, 7) and write to the Controlled-Channel File on the Server 620 (FIGS. 6, 7) the "next" 410 (FIG. 4) or the "previous" data unit in a predetermined series of data units within the Database. This is illustrated in FIG. 11, for example, where, during the transmission sequence 1112, the controller's database calls 1118b, 1118c, 1118d, and 1118e each designates a data unit to be transmitted by its sequential relationship to the previously transmitted data unit (i.e., "Next"), based on their relative positions within the exemplary Database excerpt 1110.

5. End-User Receipt of Change

After the Controller Application has changed the Controlled-Channel File (or any relevant Proxy File) on the Server 620 (FIGS. 6, 7), each End-User Device's browser, by running the Polling Script 1212 (FIG. 12B), will request, download, and display and/or otherwise process the change on the End-User Device 516, 518, 520 (FIGS. 5, 7). As those skilled in the art will recognize, the Polling Script 1212 (FIG. 12B), by means of Ajax technologies such as the XMLHttpRequest object or equivalents thereof, may download and display the new data in an end-user's browser asynchronously 1206 (FIG. 12A) and seamlessly, without disrupting the browser's display medium and using less bandwidth than would be required to reload the revised Controlled-Channel File in its entirety.[21]

[21] See, e.g., Garrett, *Ajax: A New Approach to Web Applications*, supra note 13; Merrill, *Performance Impacts of AJAX Development*, supra note 13, W3C, *The XAMLHttpRequest Object*, Apr. 15, 2008 working draft, available at w3.org/TR/2008/WD-XMLHttpRequest-20080415/ (last accessed Jul. 15, 2009).

FIG. 12C shows exemplary pseudocode for a Controlled-Channel File, including an embedded Polling Script's use of the XMLHttpRequest object 1224 to poll the Server every 500 milliseconds 1232. The Polling Script detects any changes 1226 made to a Proxy File 1230 that corresponds to the message displayed by the Controlled-Channel File when rendered by the end-users' browsers 1234, and writes any such changes detected to the appropriate portion of the Controlled-Channel File on the End-User Device 1228 for display by the end-users' browsers. Those skilled in the art will recognize that the XMLHttpRequest object may be used for this purpose in ways different from but equivalent to the one illustrated by FIG. 12C, including by use of its responseXML property instead of its responseText property. They also will recognize that the XMLHttpRequest object is one of a number of equivalent methods for establishing a persistent connection, each of which may serve to accomplish the equivalent functions.

6. Controller-Prompted Transmission

By the foregoing steps, a human and/or automated controller may transmit to a plurality of end-users a change the controller makes to a Controlled-Channel File on the Server. FIG. 5 illustrates the process from the end-user's perspective; FIG. 6 from the controller's perspective; and FIG. 7 illustrates how transmission and reception operate in parallel. Referring to FIG. 7, iterative use of the Controller Application to change 620 (FIG. 7) the Controlled-Channel File 710 (FIG. 7) on the Server, in conjunction with end-users' iterative receipt of the successive changes 520 (FIG. 7) by means of the Polling Script run by their End-User Devices' browsers 516 (FIG. 7) enables the controller to transmit successive data units to a plurality of end-users.

When the Polling Interval 1214 (FIG. 12B), 1231, 1232 (FIG. 12C) is made short enough, end-users 136 (FIG. 1) may receive changes to the Controlled-Channel File 710 (FIG. 7) almost instantaneously. Near instantaneous receipt of changes is best accomplished with a Network 130 (FIG. 1) with relatively high bandwidth and low latency, such as a wired or Wi-Fi LAN. For embodiments where near instantaneous receipt is not important, the Polling Interval 1214 (FIG. 12B), 1231, 1232 (FIG. 12C) may be lengthened to conserve power resources of End-User Devices 134 (FIG. 1) and reduce load on the Server 110 (FIG. 1) and Network 130 (FIG. 1).

In this regard, a new data unit written to the Controlled-Channel File may itself be or contain a client-side script, in whole or in part, for processing by the End-User Device's browser. Thus, the new data unit may include, for example, a revised Polling Interval 1240 (FIG. 12D) for the Controller Application to insert into the Polling Script 1212 (FIG. 12B) within the Controlled-Channel File. The Controller Application 116 (FIG. 1) may thereby modulate the frequency with which End-User Devices 134 (FIG. 1) poll the Server 110 (FIG. 1). 516 (FIG. 7) for changes to the Controlled-Channel File 710 (FIG. 7), as appropriate for embodiments in which periods of slower and faster polling frequencies are desirable. For theatrical subtitles, for example, the Polling Interval 1214 (FIG. 12B) may be lengthened during an intermission, and shortened when the performance resumes.

7. Push Variation

Figure 12A:
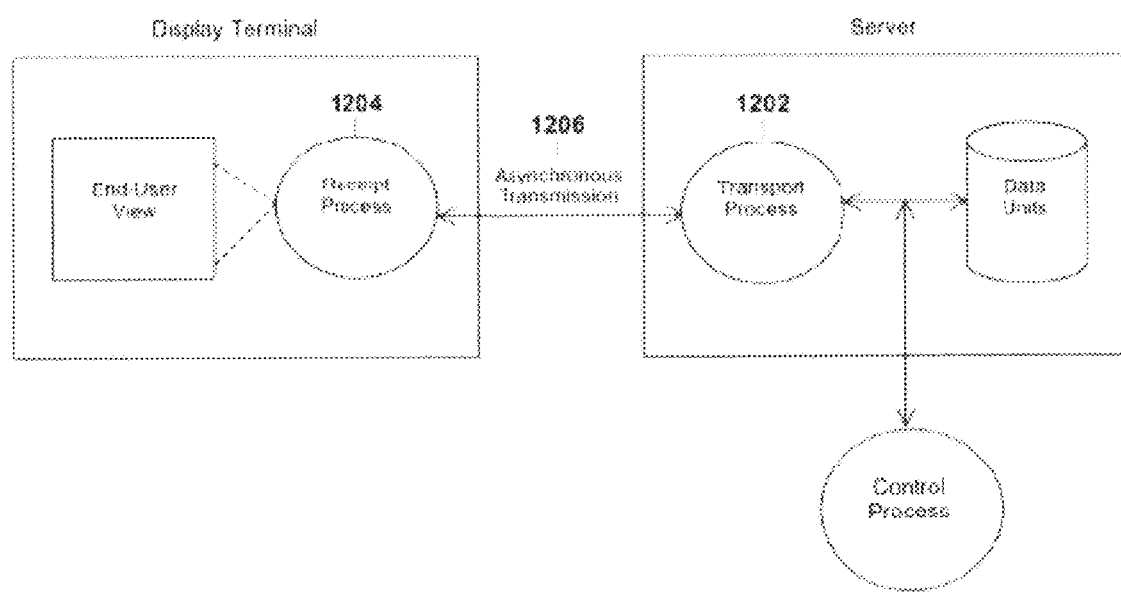
FIG. 12A illustrates a schematic overview of the invention's control, transport, and receipt processes, exemplary pseudocode for portions of which is shown in FIGS. 12B, 12C, 12D, 12E, and 12F.

As an alternative or in addition to polling by browsers, the Server may invoke the data transport process 1202 (FIG. 12A) by pushing changes to browsers and/or other software processes residing on the End-User Devices (collectively, a "receipt process") 1204 (FIG. 12A).

As with Ajax polling, a push-based data transport process may asynchronously transmit data units 1206 (FIG. 12A). With a push design, however, a process called a "listener" runs on the End-User Device as part of its receipt process. As illustrated by FIG. 12F, instead of polling the Server repeatedly for new data before any may yet be available, the listener waits for messages from the Server. When new data becomes available, the Server may immediately send that new data to the listener for display by the End-User Device. Or, as illustrated by FIG. 12E, the Server may send a lighter-weight notification that merely informs the listener that the new data is available. This lightweight notification in turn triggers the listener to invoke the receipt process to request the new data in its entirety from the Server, as shown in FIG. 12F.

An advantage of a push design in relation to repeated polling is that it reduces the loads that the End-User Devices, Server, and Network must bear, respectively, from sending, receiving, and conveying inquiries for new data before the new data is ready.

As illustrated by FIGS. 12E and 12F, with a push design based on a "publish/subscribe" model, the receipt process on the End-User Device first informs the Server of the listener's existence, and requests that the Server inform the listener when pertinent events occur. This is referred to as "registering" the listener. When the Server sends notifications, it addresses them to registered listeners. Examples of protocols that operate on this model, and with which the present invention may be implemented, include without limitation: SMTP, to send an Internet email with a trigger keyword in the subject line; SMS, to send a short notification to a dedicated channel ID (defined as a port in the SMS specification); or a new protocol built on HTTP or TCP/IP, of which the nascent Server-Sent Events and Web Sockets protocols are examples.

Alternatively, with a push design based on a "broadcast" or "multicast" model, no subscription by End-User Devices is necessary. The Server's data transport process simply transmits general notifications over a data pathway specified by a protocol used in common by the Server and the End-User Devices. In turn, the End-User Devices' listeners simply monitor the appropriate data pathway for such general notifications. IP Multicasting[22] is an example of a protocol that operates on this model, and with which the present invention could be implemented.

[22] See, e.g., Steve Deering, *Host Extensions for IP Multicasting*, Request For Comments 1112, Network Working Group (1989), available at ietf.org/rfc/rfc1112.txt (last accessed Jun. 9, 2010).

Either model of push design also may rely on the establishment of an "out of band" or secondary-signaling channel. In other words, the communications pushed by the Server may travel to the End-User Device over the same network connection used to deliver a Controlled-Channel File initially, or they may travel over a parallel alternative connection.

It will be appreciated throughout this patent document, without need for repeated specification, that data unit transmissions described as being invoked by browser polling may be accomplished as well by a Server push implementation.

8. Addition of Database

By harnessing the Database 114 (FIGS. 1, 7) to the Controller Application 116 (FIG. 1), 618 (FIG. 7), associated data units 1110 (FIG. 11) may be transmitted in a predetermined succession 1112 (FIG. 11), either at predetermined time intervals or to coincide with a series of occurrences external to the computer system, or a combination thereof. Embodiments may include, for example. "slide show" style applications for predictable sequential presentations, such as: (i) subtitles to accompany a movie or scripted live theatrical performance or concert, (ii) text, static or moving images, or sound to supplement an in-person or telephonic prepared oral presentation, (iii) successive pages of a musical score, to be viewed by the audience and/or the performers at a concert, or (iv) successive portions of a liturgy. FIG. 11 illustrates such an embodiment for a theatrical performance.

Alternatively or in addition, the Database may be populated with associated data units 1010a-d (FIG. 10) that, although prepared in advance, are transmitted spontaneously, in a sequence determined contemporaneously with transmission, to respond to and coincide with anticipated occurrences the appearance and sequence of which cannot be reliably predicted 1012 (FIG. 10). Embodiments include, for example, transmitting data to accompany a public athletic competition, as illustrated in FIG. 10. Thus, for example, data pertinent to an individual athlete on a team may be transmitted as and when that athlete performs 1012. Similarly, pre-scripted text or images exhorting spectators to perform specific cheers, for example, may be transmitted as and when appropriate during the course of the competition 1012. Pre-scripted advertisements may be transmitted in the same manner 1012.

Additional embodiments permit a human operator to create and transmit fresh data, which has not been preloaded into the Database, to react to unforeseen occurrences as and when they may transpire. Such data may include, for example, textual announcements, such as, for example, at a public gathering, that a particular automobile's headlights have been left on. Or, at a convention, that the start time or location for a certain presentation has been changed. Or, at a retail establishment, that a customer's order is ready. Or, for example, data units transmitted at an athletic competition may include hyperlinks to video replays of the competition's highlights as and when they occur. Or, for example, a streaming textual feed (such as from a computer-assisted stenographic system, or the closed-captions of a television broadcast[23]) may be retransmitted in increments: each time the feed adds a predetermined number of new lines to a text file butffer, the Controller Application may read those new lines and use them to overwrite a designated portion 1216 (12B) of a Controlled-Channel File.

[23] See, e.g. *In the Matter of Closed Captioning of Video Programming, Closed Captioning Requirements for Digital Television Receivers*, Federal Comm's Comm'n, Declaratory Ruling, Order, and Notice of Proposed Rulemaking, Nov. 3, 2008 (Docket No's 99-254, 05-231) (FCC No. 08-255), ¶¶ 2-4, 11 available at hraunfoss.fcc.gov/edocs_public/attachmatch/FCC-08-255A1.pdf (last accessed Jul. 15, 2009); *In the Matter of Closed Captioning and Video Description of Video Programming*, Federal Comm's Comm'n. Notice of Proposed Rulemaking, Jan. 9, 1997 (Docket No. 95-176), ¶¶7-9, 20-21, 24-25 available at fcc.gov/Bureaus/Cable/Notices/1997/fcc97004.txt (last accessed Jul. 15, 2009).

B. Controller-Prompted Transmission Over Multiple Channels

Figure 8:
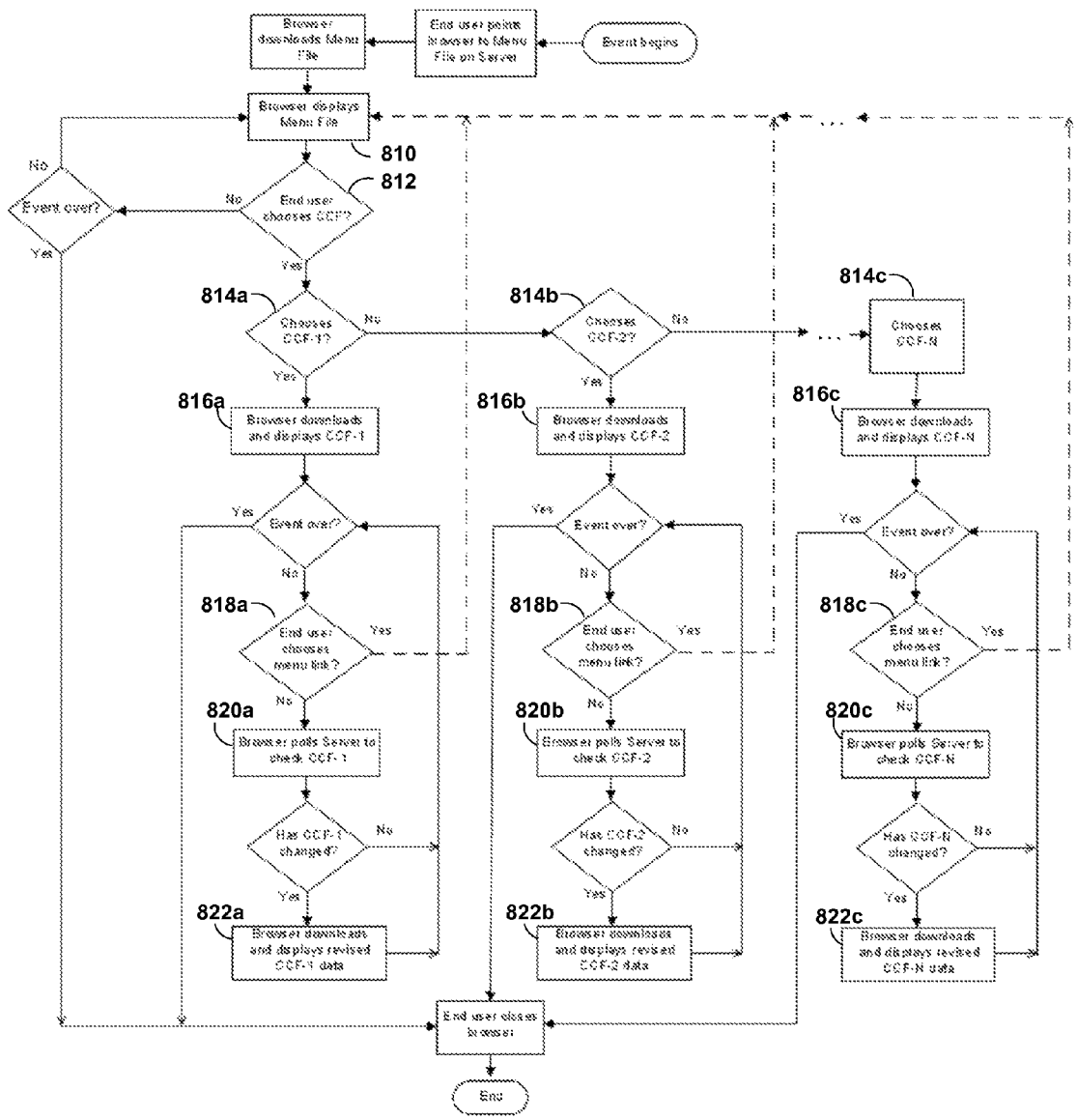
FIG. 8 shows an exemplary process by which an end-user may download to an end-user device any of a plurality of controlled-channel files, where each controlled-channel file may serve as a separate channel for the end-user to receive transmission of successive data units, and where the end-user may change channels by means of a menu file that is hyperlinked to and from each controlled-channel file.

Data may be transmitted over a plurality of channels on a controller-prompted basis by placing a plurality of Controlled-Channel Files 112 (FIG. 1-3) on the Server 110 (FIG. 1-3). As illustrated by FIG. 8, each Controlled-Channel File 1 through N, once downloaded by an End-User Device 816a-c, serves as a bridge for controller-prompted transmission of a distinct channel of data units to that End-User Device. End-users may choose to download the Controlled-Channel File that corresponds to whichever channel they wish to receive. Their End-User Devices' browsers, by running the Controlled-Channel File's embedded Polling Script 820a-c, download and display changes to the file as the changes are made 822a-c. Changes are made to the Controlled-Channel Files as and when appropriate for the particular embodiment of the invention 620 (FIG. 7), 1118a-e (FIG. 11).

End-users may change channels at will by downloading a different Controlled-Channel File. If appropriate to the particular embodiment, Controlled-Channel Files may contain hyperlinks to one another 1220 (FIG. 12B), facilitating the end-user's ability to "channel surf," i.e., browse among channels. Alternatively, each Controlled-Channel File may provide a hyperlink to a hub file or "menu" file 1222 (FIG. 12B) that itself provides hyperlinks to other Controlled-Channel Files 818a-c, 810, 812, 814a-c (FIG. 8). If an end-user's browser is capable of opening a plurality of browser windows at the same time, the end-user may monitor a plurality of channels simultaneously by opening separate Controlled-Channel Files in separate browser windows.

1. Synchronous Parallel Transmissions

With multiple Controlled-Channel Files 112 (FIGS. 1-3), a Controller Application 116 (FIGS. 1-3) may transmit successive arrays of associated data units, in parallel, over multiple channels 1112 (FIG. 11). Each array may be preloaded into a Database record 1114 (FIG. 11), for example, with each of the array's constituent data units 1 through N 1114a-c (FIG. 11) assigned to a field within the Database record 1114. As illustrated by FIG. 12D, when prompted 1236 (FIG. 12D), 1118 (FIG. 11) the Controller Application 116 (FIGS. 1-3) may read the group of fields 1 through N from the Database 114 (FIGS. 1-3), 1110 (FIG. 11), and write the contents of each field, respectively, over a portion 1216 (FIG. 12B) of each of a plurality of Controlled-Channel Files 1 through N 112 (FIGS. 1-3), 1112 (FIG. 11). The changes to each of Controlled-Channel Files 1 through N, in turn, are downloaded and displayed by all end-users' browsers that previously have downloaded that Controlled-Channel File and are running its Polling Script 822a-c (FIG. 8).

In this manner, by providing a single cue to the Controller Application 1118 (FIG. 11), 1236 (FIG. 12D), a controller may transmit associated data units, simultaneously, and in parallel, over separate channels 1112 (FIG. 11), 1238 (FIG. 12D). The process may be iterated, with successive arrays of data units being transmitted upon successive cues 1118a-e (FIG. 11l), 1242 (FIG. 12D). Cues may be given, for example, by a human operator 132 (FIGS. 1, 2) pressing a button or other input device, by an automated timing algorithm, and/or by a signal from a Cueing Application 310 (FIG. 3), 1236 (FIG. 12D).

Exemplary embodiments include those that provide successive arrays of textual or other content to coincide with a series of occurrences. Such embodiments include, for example:

(a) Providing Multilingual Subtitles for a Live Theatrical, Operatic, or Popular Music Performance.

In such an embodiment, the arrays may pertain to successive portions of script, libretto, or lyrics as they are spoken or sung, as illustrated by FIG. 11. One field of each array may provide a transcription in the language of performance 1114a. Additional fields of the array may provide translations into additional languages 2 through N 1114b-c. The Controller Application may be triggered to transmit each successive array 1112 by a human operator, a pre-programmed timing algorithm, signals from a Cueing Application, or by combinations of the foregoing methods 1236 (FIG. 12D).

(b) Providing Multilingual Subtitles to a Speech or any Other Type of in-Person or Telephonic Oral Presentation, Including, for Example, Such a Presentation for Business, Educational, Political, or Other Social Purposes.

Such an embodiment would be implemented in a manner equivalent to example (a) above.

(c) Providing Multilingual Subtitles or Commentary for a Movie, Television Program, or Other Presentation of an Audiovisual Recording.

Such an embodiment would be implemented in a manner equivalent to example (a) above. In addition, Cueing Applications available for use in such an embodiment include well known techniques by which a motion-picture projector may transmit a signal to synchronize other facilities with display of an audiovisual recording.[24]

[24] See, e.g. U.S. Pat. No. 6,741,323 B2 to Plunkett (2004), col. 1, lines 28-53.

(d) Providing Multilingual Descriptions or Other Data Pertaining to Geographic Locations as and when End-Users Travel or are Transported from Location to Location.[25]

Such an embodiment would be implemented in a manner equivalent to example (a) above. In addition, Cueing Applications available for such an embodiment encompass use of location-sensitive applications to signal when end-users have arrived at a pertinent geographic site. Locations for which such an embodiment could be applied include, for example, exhibits at a museum; floors, aisles, or other sections of a large retail establishment; stops within a municipal mass-transit system; attractions at a theme park; or dispersed tourist attractions.

[25] Regarding the nascent and growing availability of mobile Wi-Fi connections, see, e.g., Joe Sharkey, *In-Flight Entertainment That Begins With Wi-Fi*, N.Y. Times, May 26, 2009, at B6; David Pogue, *Wi-Fi To Go, No Cafe Needed*, N.Y. Times, May 7, 2009, at B1.

2. Asynchronous Parallel Transmissions

Alternatively or in addition, when a plurality of channels are transmitted, the controller may transmit data units over one or more of the channels independently of and asynchronously with transmissions over the other channels. This is useful, for example, where a plurality of data channels are relevant to an event or group activity, but the data units pertinent to one or more of those channels change at a different rate than do the data units pertinent to the other channels.

Thus, at a theatrical performance, for example, one set of channels may provide line by line translations of the script, in multiple languages, as the lines are spoken by the actors, while another set of channels, in the same languages, may provide scene by scene commentary about the performance.

Similarly, for spectators at a professional baseball game, for example, one channel may identify and provide information about the batter at the plate as and when each batter changes; another channel may provide a cumulative menu of hyperlinks to video highlights of the game, updated as such highlights occur; and another channel may provide periodic reports of other baseball games being played contemporaneously.

Similarly, at a popular music concert, for example, one channel may provide lyric by lyric transcriptions of the songs performed, changing as each successive lyric is sung, while another channel may provide identifying and background information about each song, changing as each new song commences.

Similarly, during performance of a classical music composition, for example, one channel may display successive pages of the musical score, changing as each page is played, while another channel may provide textual commentary pertaining to alternative spans of the performance, changing as each such span is performed (identifying major themes, for example, and/or sections of movements).

Similarly, End-User Devices may be distributed at different locations within a vehicular traffic system, for example, with each End-User Device including a display screen large enough to be suitable for vehicular traffic signage. Traffic advisories or directives may then be transmitted to each End-User Device, and shown on its display screen, with the timing and content of each transmission to be determined based on the location of the End-User Device, the direction of the traffic to which its display screen is oriented, time of day, and ambient traffic, road, and weather conditions.

C. Integration With End-User-Navigated Files

Controlled-Channel Files, in addition to being linked with one another, may be linked with other structured document files that do not themselves contain a Polling Script or otherwise serve as a conduit for controller-prompted transmissions, but rather serve as repositories of data for end-users to browse at their own pace ("End-User-Navigated Files") 126 (FIGS. 1-3). One or a plurality of End-User-Navigated Files 126 may reside on the Server 110 (FIGS. 1-3).

Figure 9:
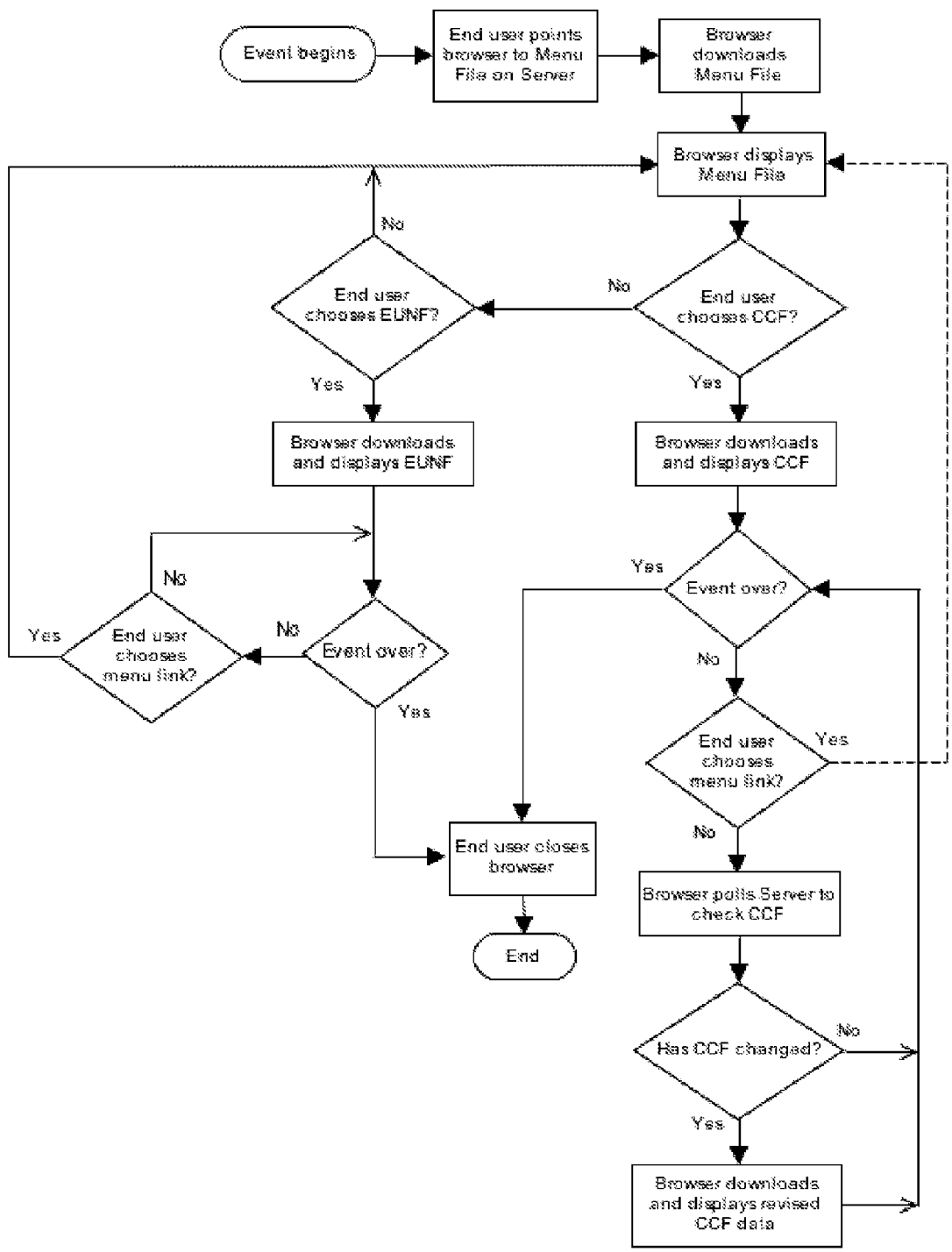
FIG. 9 shows an exemplary process by which an end-user may download to an end-user device either a controlled-channel file or an end-user-navigated file, and may switch back and forth between both kinds of file by means of an interconnecting menu file.

End-users may navigate among End-User-Navigated Files 126 and Controlled-Channel Files 112 by means of interconnecting hyperlinks, of which 1218 (FIG. 12B) is an example. The navigation may be assisted, if appropriate to a particular embodiment, by means of hub or "menu" files that themselves provide hyperlinks to, and may be reached via hyperlinks from 1222 (FIG. 12B), a plurality of End-User-Navigated Files and/or Controlled-Channel Files (and/or other menu files). FIG. 9 shows an exemplary process by which a menu file may mediate an end-user's navigation among a plurality of End-User-Navigated Files and Controlled-Channel Files.

Integration of Controlled-Channel Files with End-User-Navigated files is useful, for example, in various embodiments for live events because two distinct categories of data may appeal to end-users during the course of a live event.

One category of data either changes or changes markedly in importance at discrete moments during the course of an encompassing event. At an opera, for example, the translation of an aria is most important while it is being sung. Or, at a classical music concert, for example, a page of a score is most important while it is being played. Or, at a baseball game, for example, the identity of the batter at the plate changes at least six times per inning. As appropriate for any particular embodiment, it often may be preferable to transmit such data to end-users on a controller-prompted basis via Controlled-Channel Files.

The other category of data, in contrast, is not expected to change during the course of an event, and is likely to be approximately as interesting to end-users at any given moment during the event as at any other. Such data may include, for example, at a theatrical or operatic performance, a synopsis of the plot, or the cast members' names and biographies. Or, at a classical music concert, for example, it may include the concert's program or composers' biographies. Or, at a baseball game, for example, it may include a schedule of the home team's remaining home games. As appropriate for any particular embodiment, it often may be preferable to make such data available to end-users via End-User-Navigated Files, so that end-users may access the data on a self-directed basis, at times and in a sequence of their own choosing throughout the course of an event.

As illustrated in FIG. 9, by integrating Controlled-Channel Files and End-User-Navigated Files by means of hyperlinks, an embodiment may enable end-users to switch at will between receiving transmissions of controller-prompted data and browsing other data at a pace and sequence of each end-user's choosing.

As the present invention may be embodied in numerous forms without departing from its spirit or essential characteristics, it should be understood that above-described embodiments are not limited by any details of the description, but rather should be construed broadly within the invention's spirit and scope as defined in the appended claims, and therefore all changes and modifications that fall within the meets and bounds of the claims, or equivalence of such meets and bounds, are therefore intended to be embraced by the appended claims.

What is claimed is:

1. A method of transmitting a plurality of data units, in succession, via a computer network, to at least one end-user, the method comprising:

a. providing at least one server comprising a first computer system including
   i. a first central processing unit, a first memory capacity, a first operating system software application, a first data storage medium, and a first input/output device, and
   ii. a server software application operable to communicate based on at least one network communication protocol;

b. permitting the at least one end-user to use at least one end-user device in a network with the server, each end-user device comprising a second computer system including
   i. a second central processing unit, a second memory capacity, a second operating system software application, a second data storage medium, and a second input/output device, and
   ii. a software application operable to communicate based on said at least one network communication protocol;

c. enabling said server's signals to reach said end-user device, enabling said end-user device's signals to reach the server, and thereby enabling two-way communication between the server and the end-user device via said network communication protocol;

d. storing at least one controlled-channel file on the server, with each controlled-channel file comprising a structured document file written in a markup language, and including (i) at least one of a first of said data units to be transmitted via the controlled-channel file and a link to said first data unit and (ii) at least one of an embedded transceiving script and a link to said transceiving script;

e. permitting said end-user to cause said end-user device to receive said controlled-channel file and its associated first data unit and associated transceiving script, and thereafter providing for the end-user device (i) to display, play, or otherwise process said first data unit and (ii) to execute said transceiving script:

f. ascertaining, as prompted by execution of said transceiving script, if the controlled-channel file or a proxy file representing at least part of the controlled-channel file has been altered on the server;

g. enabling a controller to alter on the server each controlled-channel file or its proxy file so that the controlled-channel file or its proxy file reflects altered or additional data to be transmitted to the end-user;

h. providing for said controller to alter on the server each controlled-channel file or its proxy file so that each altered controlled-channel file or its altered proxy file includes a next data unit to be transmitted to the end-user;

i. permitting the end-user device, as prompted by execution of the transceiving script, (i) to receive from the server the next data unit from the altered controlled-channel file corresponding to the controlled-channel file previously received by the end-user device or from its altered proxy file, and then (ii) to display, play, or otherwise process the next data unit; and j. repeating the steps h through i until all data units to be transmitted and received have been transmitted and received.

2. The method of claim 1, further comprising at least one of (a) a step of causing the server to push a successive data unit to the end-user device and (b) a step of causing the server to push to the end-user device a notification that a data unit is ready for transmission.

3. The method of claim 1, wherein a plurality of controlled-channel files are stored on said server, and wherein the method further comprises a step of permitting the end-user to cause the end-user device to download any controlled-channel file from the server in substitution for any other controlled-channel file previously downloaded by the end-user device from the server.

4. The method of claim 3, wherein the step of permitting the end-user to cause the end-user device to download any controlled-channel file from the server in substitution for any other controlled-channel file previously downloaded by the end-user device from the server, includes at least one of a. providing at least one of a hyperlink and a form element in said controlled-channel files that serves to link one controlled channel file to another, and b. providing at least one of a hyperlink and a form element in said controlled-channel files that serves to link to at least one menu file, said menu file comprising a structured document file written in a markup language and including at least one of a hyperlink and a form element that serves to link to said controlled-channel files.

5. The method of claim 1 wherein said controller is at least one of a human operator and an automated system.

6. The method of claim 5, wherein said automated system is prompted by at least one of (a) at least one pre-programmed timing algorithm and (b) a signal from a separate cueing application.

7. The method of claim 6, further comprising a step of providing for said cueing application to signal said automated system as prompted by at least one of (a) a sound recognition system, (b) a system for cueing theatrical lighting or set changes, (c) a system for playing or broadcasting sound files, (d) a system for displaying or broadcasting images, (e) a musical instrument digital interface system, (f) a metronomic system, (f) a system for streaming text files, and (g) a system for detecting geographic position.

8. The method of claim 1 wherein said step of enabling said controller to alter each controlled-channel file or its proxy file includes providing for a human operator to input text and to direct the inputted text to replace at least a part of or be inserted into the controlled-channel file or its proxy file.

9. The method of claim 1, wherein said step of enabling said controller to alter each controlled-channel file or its proxy file includes a. populating a database with a plurality of data units, and b. enabling said controller to designate at least one specific data unit within said database.

10. The method of claim 1, wherein a plurality of controlled-channel files are stored on said server, and wherein said step of providing for said controller to alter each controlled-channel file or its proxy file further includes a. populating a database with a plurality of said data units, b. enabling said controller to designate a set of said controlled-channel files on the server, c. enabling the controller to designate an array of data units within said database such that each data unit within said array has a one-to-one correspondence with a member of said set of controlled-channel files, and d. enabling the controller to cause each data unit within said array to replace at least a part of or be inserted into its corresponding controlled-channel file or said controlled-channel file's proxy file.

11. The method of claim 1, wherein said step of enabling said controller to alter on the server each controlled-channel file or its proxy file includes at least one of a. using said first input/output device of the server, and b. using a computer system distinct from and networked with the server to input directives.

12. The method of claim 1, further including a. storing at least one end-user-navigated file on said server, the end-user-navigated file comprising a structured document file written in the markup language, and having information complementary or supplementary to said data units, b. enabling said end-user to cause said end-user device to download said end-user-navigated file from the server and to display or otherwise process the end-user-navigated file, c. enabling the end-user who has caused the end-user device to download the end-user-navigated file from the server to thereafter cause the end-user device to download the controlled-channel file from the server, and d. enabling the end-user who has caused the end-user device to download the controlled-channel file from the server to thereafter cause the end-user device to download the end-user-navigated file from the server.

13. The method of claim 12, wherein said step of enabling the end-user to cause the end-user device to download the controlled-channel file from the server includes at least one of providing a hyperlink and providing a form element in said end-user-navigated file to link to at least one of i. the controlled-channel file and ii. at least one menu file, the menu file comprising a structured document file written in the markup language, and including at least one of a hyperlink and a form element linking to the controlled-channel file, and wherein said step of enabling the end-user to cause the end-user device to download the end-user-navigated file from the server includes at least one of providing a hyperlink and providing a form element in the controlled-channel file to link to at least one of i. the end-user-navigated file and ii. at least one menu file, the menu file comprising a structured document file written in the markup language, and including at least one of a hyperlink and a form element linking to the end-user-navigated file.

14. The method of claim 1, further comprising a step of choosing said at least one network communication protocol from a group consisting of a. a Transmission Control Protocol, b. an Internet Protocol, c. an Internet Control Message Protocol, d. a User Datagram Protocol, e. a HyperText Transfer Protocol, f. a File Transfer Protocol, g. a Simple Mail Transfer Protocol, h. another member of the Internet Protocol Suite, i. a Global System for Mobile Communications standard, j. a Short Message Service, k. a Server-Sent Events protocol,
l. a Web Sockets protocol, and
m. a protocol that operates in reliance upon one of a through l.

15. The method of claim 1, further comprising a step of choosing said markup language from a group consisting of HyperText Markup Language, Extensible HyperText Markup Language, Wireless Markup Language, a markup language conforming to Extensible Markup Language, and a markup language conforming to Standard Generalized Markup Language.

16. The method of claim 1, wherein the steps of enabling said server's signals to reach said end-user device and enabling said end-user device's signals to reach the server include using at least one of (a) the Internet, (b) a cellular telephone network, (c) a wireless wide area network, (d) a hard-wired local area network, and (e) a wireless local area network.

17. The method of claim 1, wherein at least one of said steps of permitting said end-user device to receive said controlled-channel file and permitting said end-user device to receive said data units includes permitting said end-user device to operate a Web browser.

18. The method of claim 1, wherein said end-user device is selected from the group consisting of a desktop personal computer, a portable personal computer, a tablet device, a smart phone, a portable audio file player, an electronic reader, a portable computer game player, and a personal digital assistant.

19. The method of claim 1, wherein the first input/output device and the second input/output device are selected from the group of (a) a text input device, (b) a graphical user interface device, (c) a sound wave detection device, (d) a text or image display device, (e) a sound wave generation device, (f) a keyboard, (g) a mouse, (h) touch screen and (i) a push button.

20. The method of claim 1, wherein at least one of said data units includes instructions written in a client-side-scripting language, and said instructions are executed by said end-user-device upon receiving said instructions from the server.

21. The method of claim 1, wherein at least one of said data units includes at least one of instructions, a hyperlink and a form element that causes said end-user device or enables said end-user, by activating said hyperlink or form element, to download at least one of an end-user navigated file, a controlled-channel file, a text file, an image file, a sound file, a video file, and instructions written in a client-side scripting language.

22. The method of claim 1, wherein at least one of said controlled-channel file and said data units received by said end-user device is designated based upon said server's interpretation of a Uniform Resource Identifier received from the end-user device.

23. The method of claim 1, wherein at least one of said controlled-channel file and said data units is stored in and downloaded from said first memory capacity.

24. A method of transmitting a plurality of data units, in succession, via a computer network, to at least one end-user, the method comprising:
   a. providing at least one server comprising a first computer system including
      i. a first central processing unit, a first memory capacity, a first operating system software application, a first data storage medium, and a first input/output device, and
      ii. a server software application operable to communicate based on at least one network communication protocol;
   b. permitting the at least one end-user to use at least one end-user device in a network with the server, each end-user device comprising a second computer system including
      i. a second central processing unit, a second memory capacity, a second operating system software application, a second data storage medium, and a second input/output device, and
      ii. a software application operable to communicate based on said at least one network communication protocol;
   c. enabling said server's signals to reach said end-user device, enabling said end-user device's signals to reach the server, and thereby enabling two-way communication between the server and the end-user device via said network communication protocol;
   d. storing at least one controlled-channel file on the server, with each controlled-channel file comprising a structured document file written in a markup language, and including (i) at least one of a first of said data units to be transmitted via the controlled-channel file and a link to said first data unit and (ii) at least one of an embedded polling script and a link to said polling script;
   e. permitting said end-user to cause said end-user device to download said controlled-channel file and its associated first data unit and associated polling script, and thereafter providing for the end-user device (i) to display, play, or otherwise process said first data unit and (ii) to execute said polling script;
   f. providing for each end-user device, as prompted by execution of said polling script, to poll the server repeatedly, to ascertain if the controlled-channel file or a proxy file representing at least part of the controlled-channel file has been altered on the server;
   g. enabling a controller to alter on the server each controlled-channel file or its proxy file so that the controlled-channel file or its proxy file reflects altered or additional data to be transmitted to the end-user:
   h. providing for said controller to alter on the server each controlled-channel file or its proxy file so that each altered controlled-channel file or its altered proxy file includes a next data unit to be transmitted to the end-user;
   i. permitting the end-user device, as prompted by its execution of the polling script, and upon its next polling of the server, (i) to download from the server the next data unit from the altered controlled-channel file corresponding to the controlled-channel file previously downloaded by the end-user device or from its altered proxy file, and then (ii) to display, play, or otherwise process the next data unit; and
   j. repeating the steps h through i until all data units to be transmitted and received have been transmitted and received.

* * * * *